(12) United States Patent
Shinoura

(10) Patent No.: US 6,714,173 B2
(45) Date of Patent: Mar. 30, 2004

(54) THREE DIMENSIONAL SCREEN DISPLAY

(75) Inventor: Osamu Shinoura, Tokyo (JP)

(73) Assignee: TDK Corporation, Tokyo (JP)

( * ) Notice: Subject to any disclaimer, the term of this patent is extended or adjusted under 35 U.S.C. 154(b) by 289 days.

(21) Appl. No.: 09/824,839

(22) Filed: Apr. 4, 2001

(65) Prior Publication Data

US 2002/0044349 A1 Apr. 18, 2002

(30) Foreign Application Priority Data

Jun. 16, 2000 (JP) ........................................ 2000-181344
Aug. 25, 2000 (JP) ........................................ 2000-256226

(51) Int. Cl.$^7$ ................................................ G09G 3/00
(52) U.S. Cl. ............................ 345/32; 348/44; 352/86; 353/10; 359/478
(58) Field of Search ............................ 345/32, 7, 8, 9; 348/44; 352/86; 359/478, 619, 620, 621, 622, 623, 624, 625, 626, 627, 628; 353/10

(56) References Cited

U.S. PATENT DOCUMENTS

| | | | | |
|---|---|---|---|---|
| 4,414,565 A | * | 11/1983 | Shanks | 348/44 |
| 4,421,398 A | * | 12/1983 | Suzuki et al. | 396/150 |
| 4,671,625 A | | 6/1987 | Noble | 359/726 |
| 5,119,235 A | * | 6/1992 | Umeda et al. | 359/619 |
| 5,400,177 A | * | 3/1995 | Petitto et al. | 359/451 |
| 5,555,476 A | * | 9/1996 | Suzuki et al. | 359/619 |
| 5,790,086 A | * | 8/1998 | Zelitt | 345/32 |
| 6,014,259 A | * | 1/2000 | Wohlstadter | 359/619 |
| 2002/0085287 A1 | * | 7/2002 | Egawa | 359/619 |

FOREIGN PATENT DOCUMENTS

| | | |
|---|---|---|
| JP | 60-59317 | 4/1985 |
| JP | 5-103352 | 4/1993 |
| JP | 5-70944 | 10/1993 |
| JP | 3022558 | 1/2000 |
| JP | 2000-98298 | 4/2000 |
| JP | 2001-42805 | 2/2001 |
| JP | 2002048903 A | * 2/2002 |

OTHER PUBLICATIONS

Pages 1–8, "New Stereoscopic Vision Filter", Aug. 2, 1999 (with corr. JP 2001–42805).
Chihiro Masuda, pp. 139–145, "Three–Dimensional Image Display", Apr. 30, 1992.

* cited by examiner

*Primary Examiner*—Steven Saras
*Assistant Examiner*—Leland R. Jorgensen
(74) *Attorney, Agent, or Firm*—Oblon, Spivak, McClelland, Maier & Neustadt, P.C.

(57) ABSTRACT

A screen display apparatus is capable of visually presenting to a viewer E a secondary image 30 (virtual image and/or a real image) as an "inclined" a primary image (subject) 10, and is vertically inclined with respect to said viewer at a position, which is different from a position of said primary image 10. This is realized through an action of a lens 20. With the "inclination, the viewer E views the secondary image 30 with a three-dimensional feeling. The "inclination" is effective when the upper part of the secondary image 30 is located farther from the viewer E than the lower part thereof, and when its angle θ is within a range of 3° to 40°. Further, a screen display apparatus, a plurality of secondary images 30 (in the figures, virtual images 31 and 32) on a primary image 10 as a subject are formed by a microlens array 20 including convex microlenses 221 and concave microlenses 223. The screen display apparatus visually presents those secondary images 30 to a viewer E so that those images are viewed as a single image. As a result, an image is displayed with an intensive three-dimensionally feeling.

7 Claims, 18 Drawing Sheets

PRIMARY IMAGE

IMAGE VIEWED THROUGH FLAT PORTIONS

IMAGE VIEWED THROUGH CONVEX LENS

VIEWED IMAGE

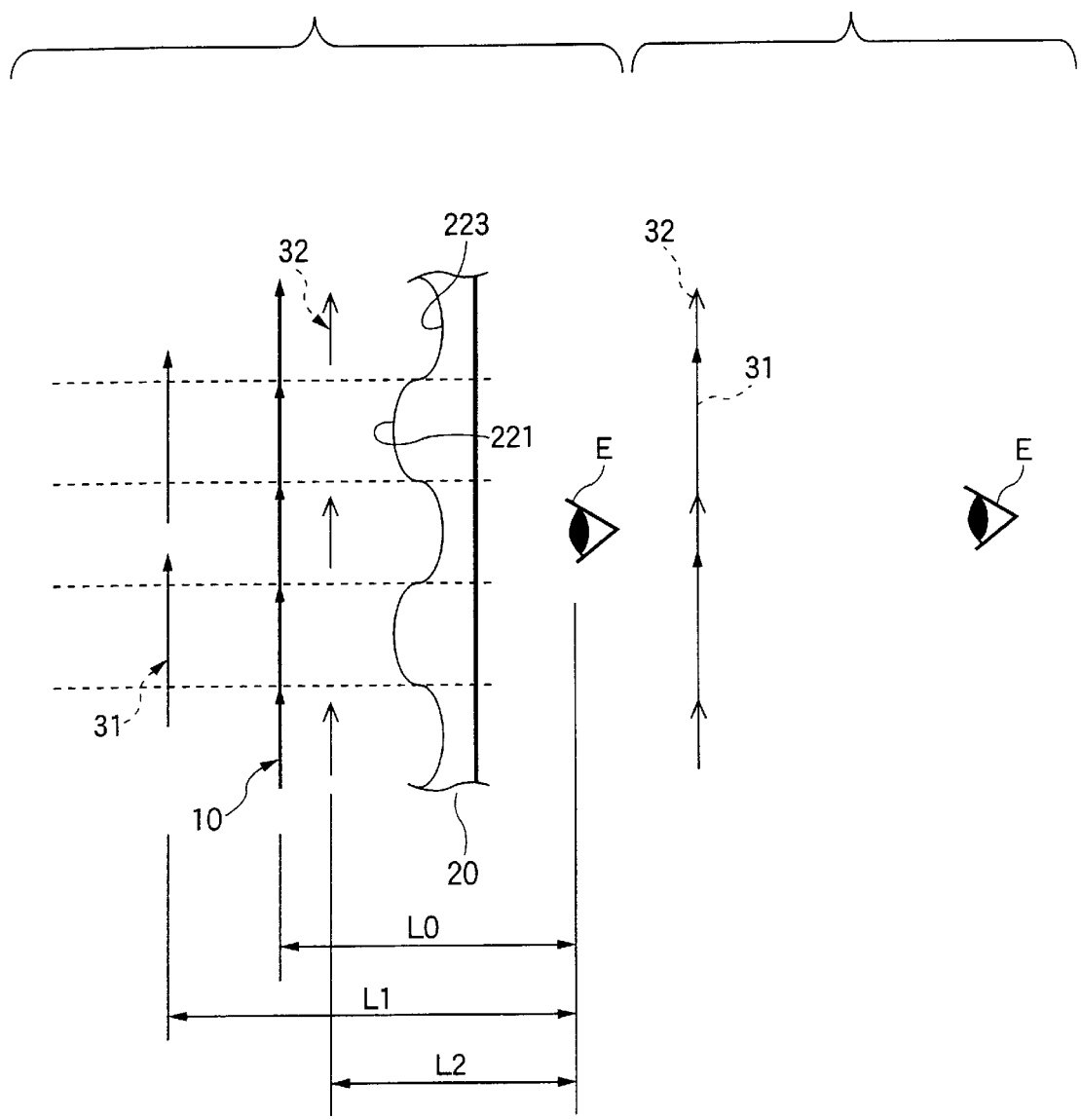

THREE DIMENSIONAL SCREEN DISPLAY

BACKGROUND OF THE INVENTION

The present invention relates to a screen display apparatus for visually displaying a picture or a screen with a good three-dimensional effect. More particularly, the invention relates to a screen displaying apparatus for visually displaying a still picture or a motion picture with an intensive three-dimensional effect by utilizing an optical illusion of the eyes of a human being, and to a lens structure well adaptable for the screen displaying apparatus.

Development of the device and method for displaying a three-dimensional image is under progress. A holography-basis device and a device utilizing a binocular parallax of human vision have widely been known. Those devices are complicated in construction and high in cost, however. Accordingly, those devices find use in some limited places, such as amusement parks and other amusement facilities. In other works, those are not yet in widespread use.

In the circumstances, techniques have been proposed which are capable of three-dimensionally displaying a two-dimensional image, such as a normal photograph or a picture displayed on a television screen, with a relatively simple construction, viz. depending on such a complicated construction as mentioned above. Examples of those techniques are JP-A-60-59317, entitled "Optical Device for Producing a Natural, Visual and Optically Interactive Image in a Free Space", and JP-A-2000-98298, entitled "Stereoscopic Video Optical Device". Each of those techniques is capable of three-dimensionally displaying the two-dimensional image and the like without the need to use the complicated construction.

"Optical Device" of JP-A-60-59317 is constructed as shown in FIG. 13. First and second convex lens lenses 200 and 201, both being rectangular convex Fresnel lenses, are located between a CRT monitor 100 and a viewer E. Those components are covered with a cover 400. The viewer E views a virtual image 300, which is formed by processing an image displayed on the CRT monitor 100 by a combination of the first convex lens 200 and second convex lens 201, and can perceive a three-dimensional image.

In "Stereoscopic Video Optical Device" of JP-A-2000-98298, as shown in FIG. 14, a viewer sees an illusion image 301 of a subject 101 for photography, which is located within a housing 401, through a convex Fresnel lens 202, and can perceive a three-dimensional image of the subject. The technical principle of this publication is substantially the same as that of the already described publication, except that the convex Fresnel lens 202 is movable along an optical axis between the lens itself and the object 101 by means of a moving means 500. In the technique of the publication, the three-dimensional effect is more enhanced through the movement of the convex Fresnel lens 202.

A new technique of "New Stereoscopic Vision Filter" is disclosed in an exhibition room established in association with "The 50th society for 3-D Video Forum (Dec. 4, 1999)". The material about the new technique distributed describes as follows:

"In the filter, a number of series of microlens elements are arrayed. In the filter, a number of series of microlens elements are arrayed. Those individual lens elements serve as pixels. Images by the lens elements are enlarged and reduced in size, but a whole image as a gathering of those lens elements is neither enlarged nor reduced. The image formed by each lens element is formed at a virtual position, and hence a whole image as a gathering of those micro-images is also formed at a virtual position. In other words, the filter is a special lens system capable of forming an image, not enlarged nor reduced, at a virtual position. As the result of forming an image at a virtual position, a two-dimensional image is viewed as a three-dimensional image, in connection with the "accommodation" as one of the stereoscopically perceiving functions of the eyes. This is a sort of an optical illusion of the eyes. This fact is well known as described on the magnifying glass for forming an enlarged image by Dr. Takakei Okoshi in his book "3-D Image Science & Technology". In the filter, the magnifying function of the magnifying glass is removed, and only the image position is spaced from that of the subject as in the magnifying glass. One can perceive the displayed whole image, neither enlarged nor reduced in size, viz., of its original size, in a three-dimensional fashion. The filter produces the feeling of distance as if a distant object moves to the back, not a straightforward three-dimensional feeling as if an object suddenly comes out, which is yielded on the basis of the "binocular parallax" widely used in the systems yielding the stereoscopic feeling. Accordingly, the beauty is created with a gentle stereoscopic effect. Use of the filter varies a shade of color, and the resultant image looks more beautiful. The reason why the color tone is varied is unclear; however, it is certain that the color shade variation is not due to the development of the stereoscopic feeling. The filter presented in the exhibition uses microlens that are each cylindrical in shape, and is analogous to the lenticular plate. However, the stereoscopic vision filter is different from the well known stereoscopic vision using the lenticular plate. This is readily seen from the difference between the displayed images of them. The conventional stereoscopic vision based on the lenticular plate needs a special image by composing images viewed from at least two points in a rectangular shape. On the other hand, the stereoscopic image presenting system of the filter needs a normal image viewed from one point. Accordingly, in is capable of presenting a three-dimensional image by using a normal photograph or a normal picture. The filter used in this stereoscopic image presenting system is characterized in that a focal distance of each microlens of the microlens array is considerably larger than that of the conventional lenticular plate. When considering the working technique, it is difficult to form the curved surface of the lens at the boundary surface between it and air. When the boundary surface between solids or between a solid and a liquid is used instead, the lens will easily be formed. Thus, the lens is formed in such a manner as to kill the characteristic of the lens, which has not ever been present." A micro-lens array and a display apparatus using the same, which employ the above-mentioned features are disclosed in Japanese Patent Publication 2001-42805 published on Feb. 16, 2001.

The new technique described above produces the three-dimensional effect in a manner that as in the publication of JP-A-60-59317, a virtual image or a real image is formed at a position spaced from that of the subject. However, it is different from the publication technique in that pixels are formed anew by those individual microlenses.

It is certain that the filter yields the "three-dimensional effect". However, there is no exact theoretical explanation of the reason why the technique yields the three-dimensional effect. At the present stage, the reason for this is commonly explained by a "psychological explanation "the yielding of the three-dimensional effect will be due to the optical illusion of the eyes of the human being". Granting that the "optical illusion theory" is correct, some people delve into the "optical illusion theory" and will (physiologically) explain it in the terms of the structure of the brain of the human being (especially visual area) or an outside-world recognizing method of the brain (as it were, data processing method of the brain). However, this approach is still uncertain in its reliability. In any case, however, it is a proven fact that the above-mentioned means gives the human being (his eyes) a three-dimensional feeling, and the reproducibility of this fact is confirmed.

The conventional techniques mentioned above suffers from the following problems. The devices utilizing the holography a binocular parallax of human vision need extremely complicated constructions, as already described. With regard to the optical-illusion basis devices, viz., the devices of JP-A-60-59317 and JP-A-2000-98298, the former needs provision of a couple of lenses, and the latter needs provision of the moving means 500. Further, the cover 400 or the housing 401 is indispensably used for both the techniques. As a consequence, the devices are bulky in size, complicated in construction and high in cost. Special shortcoming is that the three-dimensional effect produced by the techniques of JP-A-60-59317 and JP-A-2000-98298 and other techniques based on the former techniques are still unsatisfactory.

A display device, which is different in principle from the techniques of the above-mentioned publications, is disclosed in Japanese Patent No. 3022558. In the disclosed display device, two-dimensional pictures are displayed on a plurality of display surfaces whose depth positions are different from one another. An observer simultaneously views those images to perceive a three-dimensional picture. To present a three-dimensional picture, this display device needs a plurality of two dimensional images prepared in accordance with the specifications. In other words, it is impossible to produce a three-dimensional image from one two-dimensional image. The stereoscopic vision filter, which was presented in an exhibition room established in association with "The 50th society for the Study of 3-D Video Forum (Dec. 4, 1999)", succeeds in device size reduction, but still suffers from the problem of insufficient three-dimensional effect.

SUMMARY OF THE INVENTION

Accordingly, an object of the present invention is to provide a screen display apparatus which visually presents a three-dimensional picture which gives a viewer an intensive three-dimensional feeling, with simple construction and at low cost, and a lens structure well adaptable for such a screen display apparatus.

To achieve the above object, according to a first aspect of the invention, there is provided a screen display apparatus which is capable of visually presenting a virtual image and/or a real image of a subject to a viewer at a position, which is different from a position of the subject, the virtual image and/or the real image being vertically inclined with respect to the viewer, and The upper part of the virtual image and/or the real image being located farther than the lower part thereof from the viewer.

According to a second aspect of the invention, a screen display apparatus is characterized in that an inclination angle of the virtual image and/or the real image is within a range of 3° to 40° with respect to a right confronting plane. A third screen display apparatus is characterized in that a part of the virtual image and/or the real image intersects a part of the subject. A fourth screen display apparatus is characterized in that the subject is substantially equal in size to the virtual image and/or the real image. A fifth screen display apparatus is characterized in that the virtual image and/or the real image is made flat.

A sixth screen display apparatus is characterized in that the virtual image and/or the real image is formed through an action of a microlens array consisting of a plurality of microlenses or a lenticular lens.

A seventh screen display apparatus is characterized in that a pitch at which the plurality of microlenses are arrayed is 300 μm or shorter. An eighth screen display apparatus is characterized in that the virtual image and/or the real image is slanted by, making the focal distances of the plurality of microlenses different. A ninth screen display apparatus is characterized in that when the subject is an image displayed on a CRT or an LCD screen, a pitch at which pixels are arrayed on the CRT or LCD screen is equal to the lens pitch of the plurality of microlenses arrayed.

A tenth screen display apparatus is characterized in that the subject is a two-dimensional image.

In the invention, a first lens structure consists of a microlens array consisting of convex and concave microlenses, which are alternately arrayed, or a lenticular lens, and is capable of visually presenting a virtual image and/or a real image of a subject to a viewer at a position different from a position of the subject in a state that the virtual image and/or the real image is inclined such that an upper part of the virtual image and/or the real image is located farther than a lower part thereof from the viewer.

An eleventh screen display apparatus of the present invention is a screen display apparatus formed with a primary image of a subject and a lens plate including a plurality of microlenses and being located the primary image and a viewer, wherein the lens plate forms a plurality of secondary images being differently distanced from the viewer and enables the viewer to perceive the plurality of secondary images as a single image.

A twelfth screen display apparatus is characterized in that assuming that Lx is a distance from the viewer to pixels forming one of the plurality of secondary images, and Ly is a distance from the viewer to pixels forming another secondary image, when Lx>Ly, the following expression is satisfied $$Lx-Ly \geq 0.05 \cdot Ly.$$

A thirteenth screen display apparatus is characterized in that assuming that Lx is a distance from the viewer to pixels forming one of the plurality of secondary images, and Ly is a distance from the viewer to pixels forming another secondary image, when Lx>Ly, the following expression is satisfied $$0.5 \cdot Ly \geq Lx-Ly.$$

A fourteenth screen display apparatus is characterized in that a maximum value of the lens pitch of the plurality of microlenses arrayed is 500 μm or shorter.

A fifteenth screen display apparatus is characterized in that the lens plate includes a portion where the plurality of microlenses are formed and another portion having no lens action.

A sixteenth screen display apparatus is characterized in that the plurality of microlenses are convex and concave microlenses.

A seventeenth screen display apparatus is characterized in that distances from the viewer to the plurality of secondary images are different for each the microlens.

BRIEF DESCRIPTION OF THE DRAWINGS

FIGS. 20A and 20B are explanatory diagrams showing a configuration of a lens for presenting a secondary image, which is used in the FIG. 19 system, FIG. 20A showing its overall configuration and FIG. 20B showing an image viewed from an observer in the form of a model;

FIGS. 21A to 22E are diagrams showing configurations of lenses, which may be used in the present invention, FIG. 21A showing a lens consisting of concave lens parts and flat parts, FIG. 21B showing another lens consisting of two different types of convex lens parts which are different in size and flat parts, FIG. 21C showing yet another lens consisting of convex and concave lens parts and flat parts which are randomly arranged, and FIG. 21D showing still another lens having convex lens parts and being locally varied in refractive index;

FIG. 22 is a diagram schematically showing an arrangement of the screen display apparatus when the lens of FIG. 21D or the like is used, and a position at which a secondary image formed by the system is displayed;

DETAILED DESCRIPTION OF THE PREFERRED EMBODIMENTS

[First Embodiment]

Figure 1:
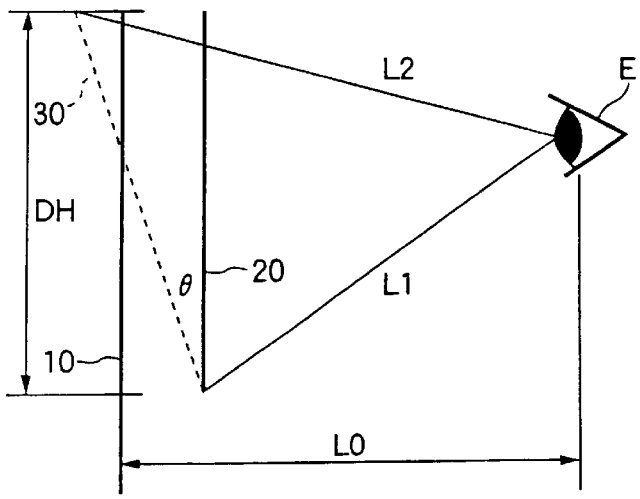
FIG. 1 is a diagram schematically showing an arrangement of a screen display apparatus which is an embodiment of the present invention, and a position at which a two-dimensional picture formed by the screen display apparatus is displayed.

A first embodiment of the present invention will be described with reference to the accompanying drawings. FIG. 1 is a diagram schematically showing an arrangement of a screen display apparatus which is the first embodiment, and a mode of its use. In FIG. 1, the screen display apparatus includes an image depicting medium (not shown) for depicting a primary image 10 as a subject, expressed so in the invention, and a lens 20. The primary image 10 has the following meaning. When the image depicting medium is a photograph, the primary image is a picture (i.e. a photograph itself) printed on the printing paper. When the image depicting medium is a display device, such as a CRT or an LCD screen, the primary image is a picture displayed on the display device or a projection picture projected on a screen or the like.

In a case where the primary image 10 is incapable of emitting light, some illuminating device for illuminating the primary image 10 is preferably provided separately from the arrangement of FIG. 1. Generally, the photograph is incapable of emitting light, and the picture on the display device emits light. Accordingly, to view a photograph, it is preferable that the illuminating device is used and projects light onto the photograph, and light reflected on the picture surface is utilized.

The lens 20 is located between the image depicting medium for depicting the primary image and a viewer E, and forms a virtual image and/or a real image which will reach the viewer E, by using the primary image. Here, the virtual image and/or real image corresponds to a "secondary image" 30 in connection with the primary image 10. Specific examples of the lens 20 are a lenticular lens and a microlens array.

Figure 2:
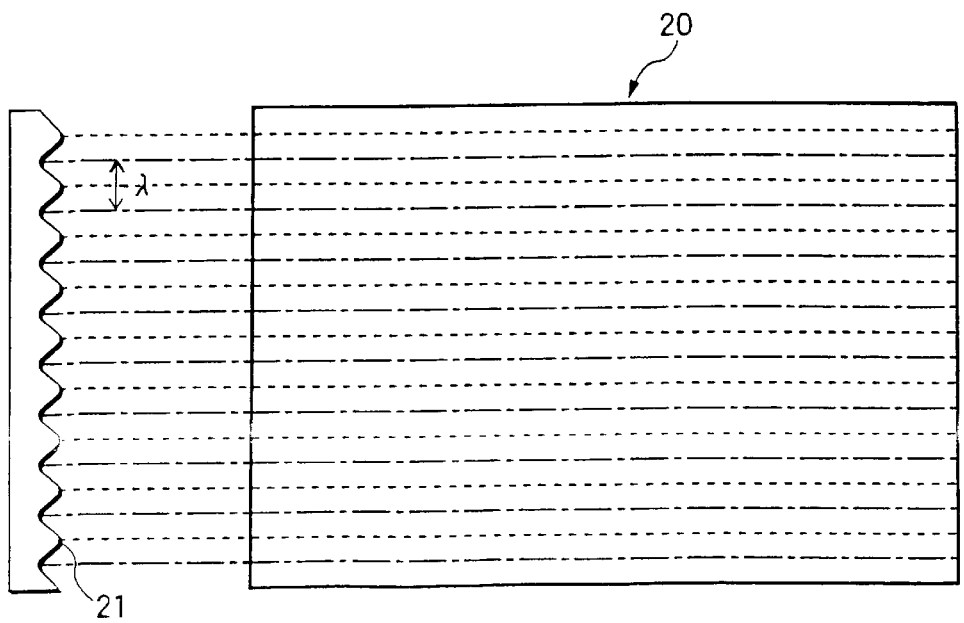
FIG. 2 is a diagram schematically showing an arrangement of a lenticular lens.

The lenticular lens is conceptually illustrated in FIG. 2. As shown, wavy lenses (small lenses) 21, which are wavy-plate or semicylindrical in cross section, are contiguously arranged side by side at fixed intervals of a wavelength $\lambda$, for example. Accordingly, a state of an image projected into the eyes of the viewer E varies with a position of the lens 20 at which a light flux passes, an angle at which the light flux passes through the lens and others. The lenticular lens that thus functions is generally known in such a use that a paper having different pictorial patterns depicted thereon is attached to the bottom side of the lenticular lens, and a viewer watches one of those pictorial patterns according to his angle with respective to the lens.

Figure 3:
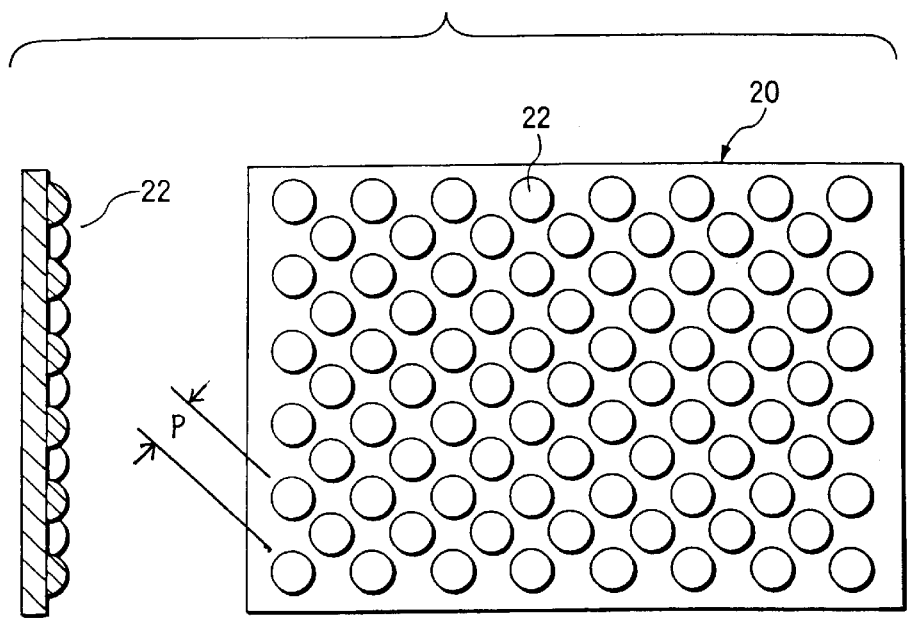
FIG. 3 is a diagram showing the concept of a microlens array.

The concept of the microlens array is diagrammatically illustrated in FIG. 3. As shown, the microlens array consists of a plurality of circular lenses (small lenses) 22, which are two-dimensional arrayed. The circular lenses 22 may be either of convex and concave lenses. A curvature of each lens may be selected as desired, basically. Here, "circular" of the "circular lenses" 22 is circular as viewed from top, as seen from FIG. 3. In the invention, the meaning of the "circular" is not limited to such. To be more exact, lenses corresponding to the circular lenses 22 in FIG. 3 may be "square", "hexagonal" or the like, as a matter of course.

The microlens array or the lenticular lens may be substituted in use by what is called a "refractive index distribution type" lens, which is substantially flat in shape and locally varied its refractive index. A planar lens utilizing a diffraction grating or hologram or another known lens may also be used instead.

In the screen display apparatus using any type of those lenses, as shown in FIG. 1, the secondary image 30 maybe inclined with respect to the viewer E as viewed in the vertical direction. The secondary image 30 maybe inclined by varying a focal distance of each of the wavy lenses 21 or the circular lenses 22. The focal distance of each of those lenses may be varied by varying a specific configuration (curvature or the like) of each lens or its refractive index, or properly selecting a material of the lens.

In particular, the "inclination" of the secondary image 30 may more exactly be set up in a manner that in the case of the lenticular lens, a height of the crest of each wavy lens 21 or the wavelength $\lambda$ appropriately varied in one lens 20, or that in the case of the microlens array, selection of either of the convex lens and the concave lens for the circular lenses 22 and the like are done in one lens 20.

Figure 4:
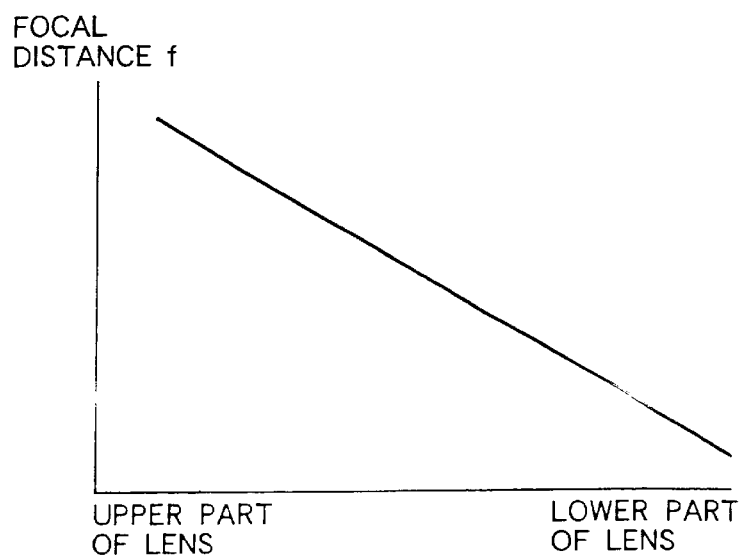
FIG. 4 is a graph showing a performance on a focal distance to be possessed by a lens 20 in FIG. 1 in order to obtain a inclined two-dimensional image 30 also shown in FIG. 1.

A inclined secondary image may be obtained by designing the lens 20 such that, as shown in FIG. 4, a focal distance "f" is long in the upper part of the lens, while it is short in the lower part. The lens 20 as mentioned above will subsequently be described again.

The operation and effects of the screen display apparatus thus constructed will be described hereunder. In the screen display apparatus in the present embodiment, as shown in FIG. 1, the viewer E does not view the primary image directly, but "views" the secondary image 30, which is the primary image viewed through the lens 20. The secondary image 30 is displayed at a position different from that of the primary image 10, and it is inclined with respect to the viewer E (involving "inclination" in meaning) as viewed in the vertical direction (FIG. 1).

A display mode of the secondary image 30, especially a direction and a degree of the inclination of the secondary image, is such that the upper part of the secondary image 30 is located farther than the lower part thereof from the viewer E. More exactly, in the screen display apparatus, as shown in FIG. 1, L1<L2 is set up to where L1 is a segment or distance between the viewer E and the lower end of the secondary image 30, and L2 is the distance between the viewer E and the upper end thereof. A desired display mode or a desired degree of the inclination of the secondary image 30, as mentioned above, may readily be obtained by adjusting the focal distance "f" on the secondary image 30. A difference between the distances L1 and L2 varies depending on a positional relationship between the primary image 10 and the viewer E. if it is selected to be within 5 to 20% with a criterion of the distance L1, a preferable inclination angle $\beta$ may be obtained (the preferable inclination angle will be described later).

The presence of the "inclination" of the secondary image 30 in the embodiment presents an image (secondary image 30) of the stereoscopic feeling, which is more intensive than of the conventional image. In other words, the viewer E perceives a more intensive stereoscopic feeling. The theoretical reason why the stereoscopic feeling is so enhanced cannot be explained by the inventors of the present patent application. It is unavoidable, so believed, that the inventors cannot theoretically explain why the stereoscopic effect is enhanced since the reason why the "three-dimensional image" is produced by such a method is not yet theoretically explained in the first place as already described in the background description. It may be estimated, however, that the reason for this is that the presence of the inclination produces the "parallax" in the vertical direction, and in turn increases a degree of the "optical illusion".

An inclination angle $\theta$ (see FIG. 1) of the secondary image 30 is preferably within a range of 3° to 40°, more preferably 5° to 30°, with respect to a right confronting plane. The reason for this is that where the inclination angle is smaller than the lower limit of the angle range, the viewer E can little perceive the three-dimensional effect, and where it is out of the angle range, a distortion of the secondary image 30 is intensive and hence the viewer is hard to view the image. Here, the "right confronting plane" means a plane being truly confronted with the viewer E. In this connection, in FIG. 1, a plane of the primary image 10 is parallel to the right confronting plane, and a straight line, which is parallel to a "vertical direction", lies on the right confronting plane.

With regard to the degree of the inclination, it directly relates to the adjustment (FIG. 4) of the focal distance "f" of the lens 20, and it is selected to be preferably the maximum focal distance "fmax" determined for the lens 20 or within a range of 1 cm to 100 cm, more preferably within a range of 2 cm to 50 cm. Where it is smaller than the lower limit of the range, the resultant three-dimensional effect is insufficient. Where it is out of the range, a natural three-dimensional feeling is lost while at the same time the manufacturing of the lens 20 is difficult. In this respect, such a selection of the inclination degree is impractical.

A difference between the distances L1 and L2 is determined by a distance Lo from the viewer E to the primary image, the height DH of the primary image, and an inclination angle β of the secondary image 30 (FIG. 1). To determine a layout producing the most three-dimensional effect when the lens 20 is actually set, what a designer has to do is to take account of those dimensions, the matters of the inclination angle β or the like.

Description to follow is elaboration of the lens 20 described above, a method of manufacturing the lens 20, a preferable structure of the lens 20, and others.

<Manufacturing Method>

A lenticular lens, a microlens array or the like may be used for the lens 20, as already described. Many methods or means to manufacture those lenses have been proposed. Any of those known methods may basically be used for manufacturing the "lens" handled in the present invention. In other words, the present invention is not limited in any way in this respect. Examples of the methods of manufacturing the microlens array are: 1) a resist pattern including circular lenses 22 is formed by photolithography process, a mold is formed for the resist pattern by an electrocasting method, and resin is put into and molded in the mold under pressure (referred to as "pressure molding method"), and 2) the individual circular lenses 22 are formed by spraying of resin by an ink jet printing method (referred to as "ink jet printing method"). Those manufacturing methods may basically be applied to the manufacturing of the lenticular lens.

To set up a variation of the focal distance "f" as shown in FIG. 4 in the lens 20 thus manufactured, a simple method to work the thus manufactured lens by some means may be employed, and further any of the following methods may also be employed.

In a case where the pressure molding method is used for manufacturing the lens 20, any of the following methods may be employed: a method in which configuration factors (curvatures and the like) of the individual circular lenses 22 are varied in value when the resist pattern is formed, another method in which resin which is to be put into and molded under pressure in the mold being formed reflecting the configurations of the individual circular lenses 22 is varied in density, and others. In a case where the ink jet printing method is employed, the amount of resin ejected is varied for each circular lens 22. In an additional method which may be used, a molded microlens array made of resin is subjected to heat treatment, whereby a part or the whole of the circular lenses 22 is welded to change its configuration. In this case, the configuration change of the circular lenses 22 may be caused through the action of the surface tension occurring with the welding and the like. The configuration change may be adjusted in a manner that the heating temperature, time and the like are controlled for each circular lens 22. The utilizing of such a "surface tension" is also disclosed in Japanese Examined patent publication 5-70944.

In any case, the "lens structure" of the invention having different focal distances "f" may be manufactured by one of the various methods mentioned above or a combination of them.

<Lens Pitch>

A pitch at which the wavy lenses 21 or the circular lenses 22 are arrayed in the lenticular lens or the microlens array (represented by wavelength λ in FIG. 2 and by pitch p in FIG. 3) thus manufactured is 300 μm or shorter, preferably 100 μm or shorter, more preferably 50 μm or shorter. The reason why the pitch is so selected in value is that if the pitch is excessively long, the natural feeling of the secondary image 30 will be lost. In the invention, there is no reason to limit the lower limit in particular. However, to obtain the preferable focal distance "fmax", it is preferable that the lens is 10 μm or longer. Further, it is believed that such a value of the lens pitch indicates a marginal capacity of the present technique.

In a case where the image depicting medium is a CRT or an LCD display, the lens pitch of the wavy lenses 21 or the circular lenses 22 is selected to preferably be integer times or 1/integer as large as the pixel pitch of the display, more preferably equal to the latter. By so doing, the moire pattern which will appear in the secondary image 30 is minimized. In a case where the primary image 10 is a color image and the color pixels of three colors R, G and B are gathered to form one composite pixel, the pitch of the composite pixels maybe used as the above-mentioned pixel pitch.

<Lens Structure—Microlens Array (1)>

Figure 5:
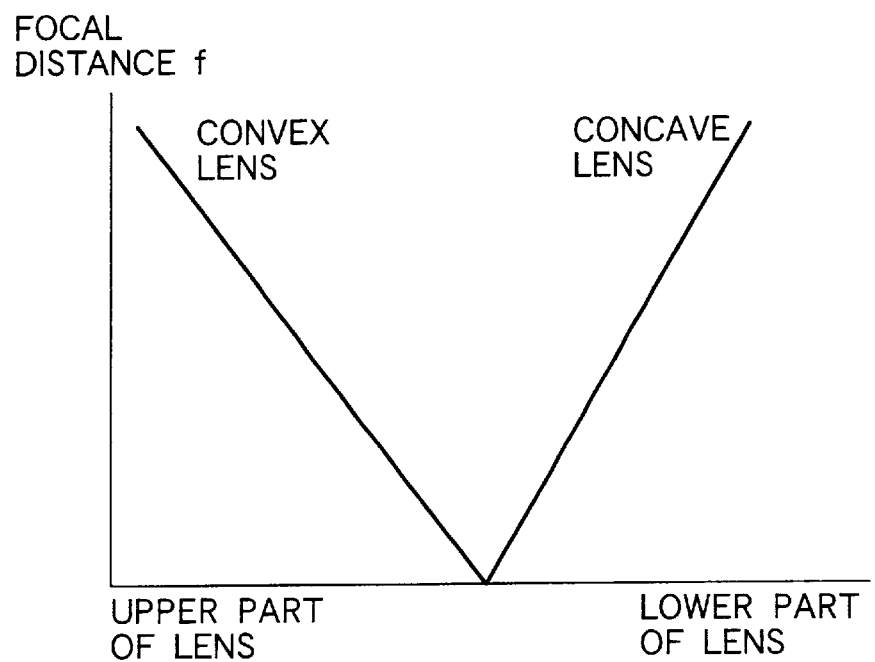
FIG. 5 graphically shows an arrangement of a microlens array different from that of FIG. 3, the abscissa representing a lens position, and the ordinate representing a type of lens (convex or concave lens)

It is most preferable that the microlens array is constructed such that the circular lenses 22 are convex in the upper part of the lens 20 and are concave in the lower part of the lens 20, as shown in FIG. 5. If so constructed, in the relationship between the secondary image 30 and the primary image 10 as shown in FIG. 1, a part of the secondary image 30 intersects a part of the primary image 10. If the position of the secondary image 30 is so set, a sense of incongruity of the viewer E when he views the secondary image 30 is lessened. Further, a fatigue of the viewer caused when he views the image for a relatively long time is also lessened.

Figure 6:
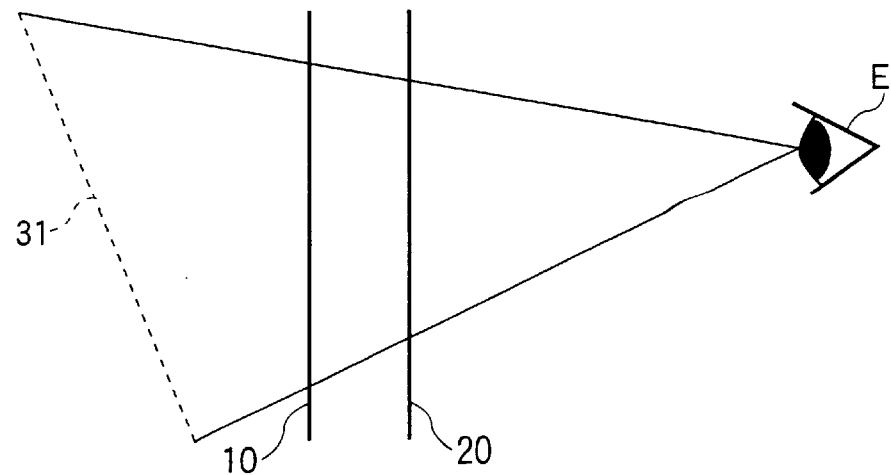
FIG. 6 is a diagram schematically showing an arrangement of a screen display apparatus different from that of FIG. 1, and a position (=the back of a primary image 10) at which a secondary image formed by the system is displayed.

In connection with the position of the secondary image 30, the "intersecting" relationship between the secondary image 30 and the primary image is not essential to the present invention. As an example, as shown in FIG. 6, the secondary image 31 may be located behind the primary image 10. The arrangement of those images may also present a three-dimensional effect to the viewer E. The FIG. 1 arrangement of the images is more preferable than the FIG. 6 arrangement when the sense of incongruity and the fatigue of the viewer are taken into consideration.

The primary image 10 is enlarged and reduced in size by those individual circular lenses 22 forming the microlens array. Therefore, where the primary image 10, like on the LCD screen, consists of a light emitting portion (image forming portion) and a wiring pattern (non-image forming portion) around the light emitting portion, the secondary image 32 may be presented as a smooth image not having the wiring pattern if only the light emitting portion is properly enlarged. In this case, the magnifying power is preferably 105 to 400%, more preferably 105 to 200%, although it depends on the type of the primary image 10. Where the reduction percentage of the pixel to be reduced is large, it is preferable that the enlargement percentage of the pixel to be enlarged is set to be large while inverse proportional to the former. As a matter of course, the enlargement/reduction percentage of those pixels vary depending on the focal distance of the circular lens 22 and the distance of it to the primary image 10. When the primary image 10 is located at a position greatly distanced from the focal distance, an image of the primary image 10 is greatly enlarged or reduced in size.

Figure 7:
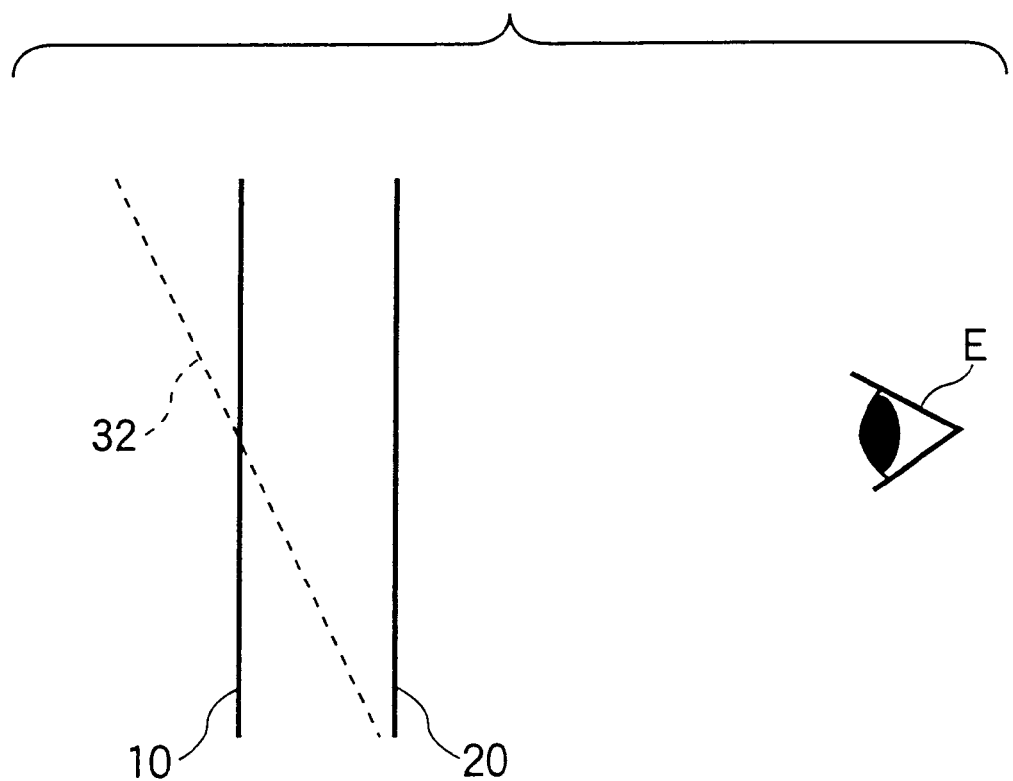
FIG. 7 is diagram showing a position at which a secondary image formed by the microlens array of FIG. 3 is displayed, the secondary image being formed with a virtual image and a real image.

For the above reason, in the case as shown in FIG. 7, the primary image 10 is substantially equal in size to the secondary image 32. Satisfaction of the condition of the "substantially equal" is preferable in gaining the effect of the invention, generally. The same thing is true for the arrangements of FIGS. 1 and 6. The reason for this is that if the secondary image is too large relative to the primary image 10, the three-dimensional effect is increased but the secondary image is small and hence hard to be viewed, and in the reverse case, the detail of the primary image 10, which otherwise should be not viewed, are is viewed, and the secondary image is likely to be coarse when viewed. A quantitative expression of "The primary image 10 is "substantially equal" in size to the secondary image 32." is that the former is within a range including 50 to 150% of the latter.

<Lens Structure—Lenticular Lens>

The details of the microlens array mentioned above may correspondingly be applied to the lenticular lens. To obtain a more beautiful secondary image, it is suggestible to use the microlens array rather than the lenticular lens. The reason for this is that in the case of the lenticular lens, the primary image is converted into the secondary image every line (or one-dimensionally) (see FIG. 2), while in the case of the microlens array, the image conversion is performed every pixel (or two dimensionally) (see FIG. 3).

<Lens Structure—Others>

Additionally, for the lens plate 20, the following description also holds. A "pasted lens structure" formed by pasting together two or more types of materials being different in refractive index rather than a single lens structure is preferable for the lens 20. When considering the already described fact Chat the focal distance "f" must be relatively long to incline the secondary image 30 shown in FIG. 1, the use of such a lens is a fairly effective approach to effect the secondary image inclination. Especially referring to the lenticular lens, a "pasted lens" having the following structure may be used. In the structure, two lenticular lenses are pasted together such that the convex and concave directions (see FIG. 2) of the lens elements of those lenses are orthogonal to each other or slanted at a given angle. In some case, a "pasted lens" which is the combination of the lenticular lens and the microlens array may be used. The lens is not limited to a lens consisting of a single lens, but it may be a lens composed of two or more number of lenses separately disposed. Further, the lens may be a lens which is composed of two lenses, one consisting of a group of convex lens elements and the other consisting of a group of concave lens elements, or formed with those lenses pasted together. It should be understood that those lenses last mentioned fall within the scope of the present invention.

Figure 8:
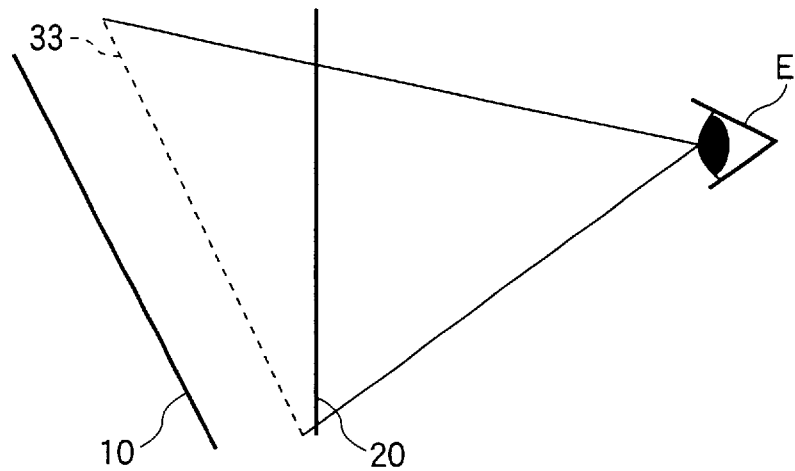
FIG. 8 is a diagram schematically showing an arrangement of another screen display apparatus and a position at which a secondary image formed by the system is displayed when a primary image 10 is inclined.
Figure 9:
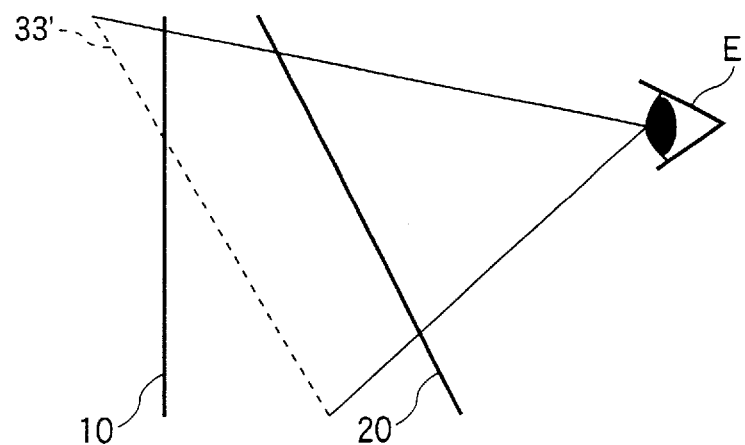
FIG. 9 is a diagram schematically showing an arrangement of another screen display apparatus and a position at which a secondary image formed by the system is displayed when a lens 20 is inclined.

Modifications of the embodiment of the present invention described above and others will be described. Firstly, in the embodiment, to obtain the inclined secondary image 30, 31 or 32 which is intensive in the three-dimensional feeling, the secondary image is inclined by utilizing the operation of the lens 20. Instead of this, as shown in FIG. 8, a secondary image 33 may be inclined by inclining the primary image 10, not by utilizing only the operation of the lens 20. Alternatively, as shown in FIG. 9, the lens 20 is inclined so that a distance between the upper ends of the lens 20 and the primary image 10 is different from a distance between the lower ends of them. In this case, even if the focal distance in the upper part of the lens 20 is different from that in the lower part, a position on the primary image 10 relative to the focal position in the upper part thereof is different from that in the lower part. A position at which a secondary image 33' is changed, so that the secondary image is inclined.

Any of those secondary image inclining techniques produces the useful effects comparable with those described above. In a case where those modifications are employed, a space occupied by the screen display apparatus is increased as a whole. Therefore, where it is desired to minimize the system occupying space, it is preferable to construct the screen display apparatus based on the embodiment already described.

Figure 10:
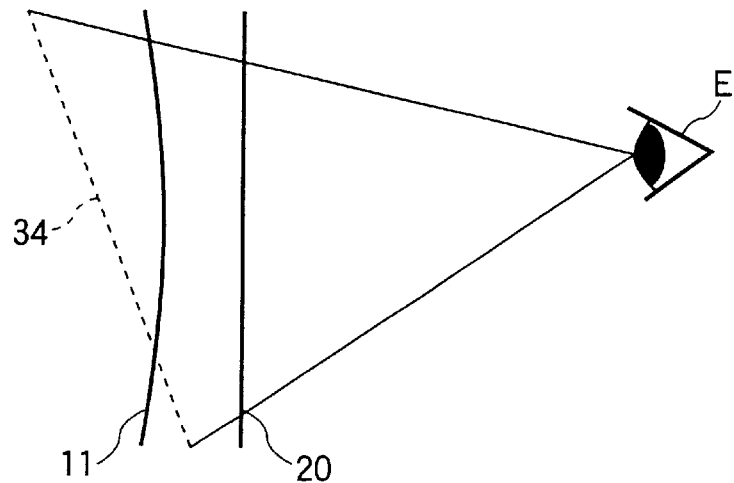
FIG. 10 is a diagram schematically showing an arrangement of yet another screen display apparatus (primary image 10 has a curved surface) and a position at which a secondary image formed by the system is displayed.

Secondly, while no mention has made as to whether the primary image 10 is a "planar or flat surface" or a "curved surface", in a case where the image depicting medium for visually presenting the primary image 10 is a known CRT or the like, its primary image 11 is a "two-dimensional image", but it is not a "planar surface" in the strict sense of the word, as shown in FIG. 10. Even in a case where the primary image has such a "curved surface", the present invention maybe implemented based on only the matters mentioned above. In this case, it is preferable to make at least a secondary image 34 "flat" (FIG. 10). The reason for this is that the three-dimensional feeling of the secondary image 34 being "flat" is more intensive than that of the secondary image being not flat, and that a fatigue of the viewer E when viewing the secondary image being flat is less than that when viewing the secondary image being not flat. The secondary image 34 may easily be made "flat" by properly adjusting the construction of the lens 20 and the like in accordance with the matters described above (for example, by adjusting the focal distances of the circular lenses 22).

In making the virtual image "flat", it is preferable to make "flat" not only a cross sectional configuration of the secondary image 34 as viewed in the vertical direction but also a configuration of the same as viewed in the "lateral direction" (=direction at a right angle to the surface of the drawing). In this case, it is preferable that the secondary image as viewed in the "lateral direction" is completely free from "slant" or "inclination" so as not to give rise to a great parallax (of the viewer E).

The "planar surface" having thus far been used means a surface having such a degree of flatness that the viewer E perceives the image flat. Accordingly, the "making it flat" used in describing the invention should be understood according to the meaning of the "planar surface". The "inclination" of the image slightly varies in the vertical or lateral direction with a position of the viewer E. However, such a slight variation of the "inclination" little affect the effect of the invention.

Figure 11:
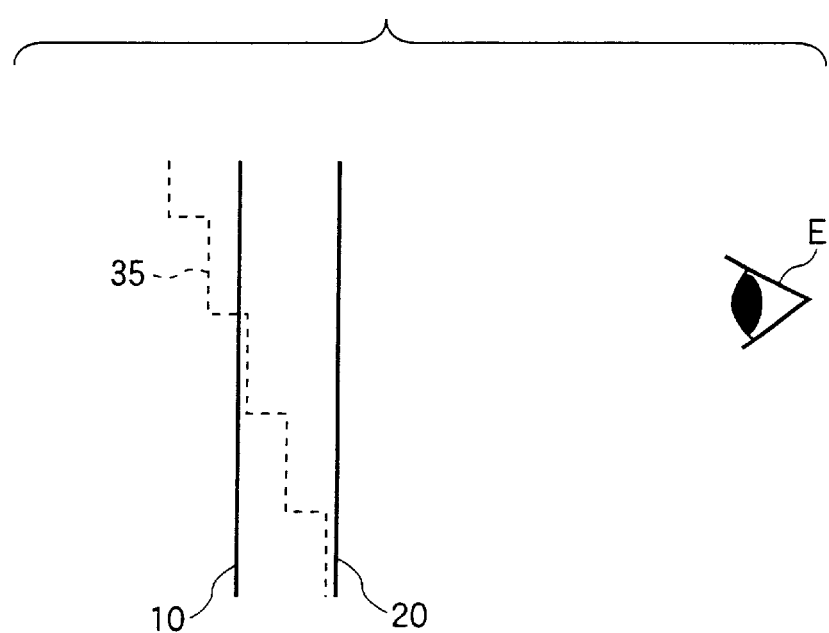
FIG. 11 is a diagram schematically showing an arrangement of yet another screen display apparatus and a position at which a secondary image (stepwise configured) formed by the system is displayed.
Figure 12:
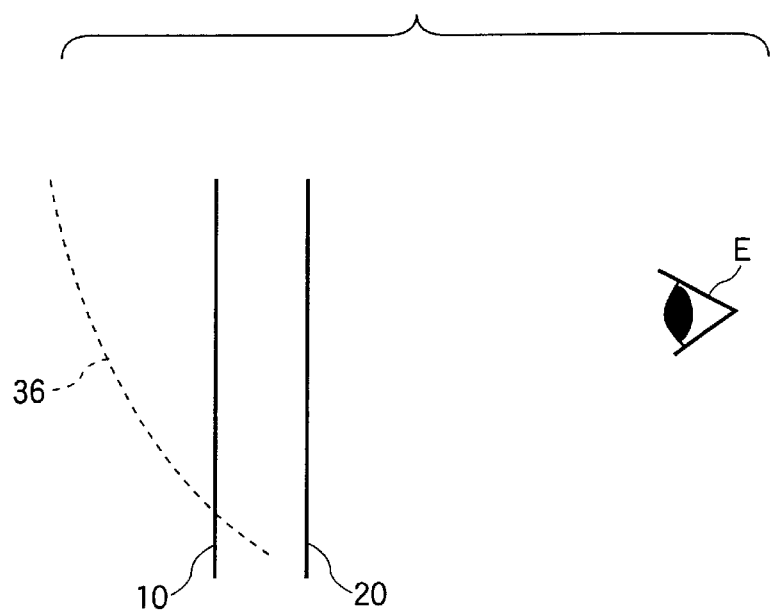
FIG. 12 is a diagram schematically showing an arrangement of still another screen display apparatus and a position at which a secondary image (whose lower part has a convex surface) formed by the system is displayed.

Thirdly, the secondary image may take forms as shown in FIGS. 11 and 12, while in the embodiment described above, it takes the form being "flat" in cross section. In the case of FIG. 11, a secondary image 35 takes a form being "stepwise" in cross section. In the case of FIG. 12, a secondary image 36 takes a form being downward "curved" in cross section. Where the secondary image 35 or 36 is utilized, the resultant three-dimensional effect may be adjusted suitably depending on the contents of the primary image 10. Specifically, in a case where the primary image 10 consists a scene whose upper part contains a mounting and whose lower part contains a person, and the scene is adjusted such that the mountain is set in a distant view and the person is set in a close view, it is sufficient, for example, to utilize the secondary image 35. The secondary image 35 or 36 may also be formed, for example, by adjusting the focal distance of the lens 20, as a matter of course.

Fourthly, in the embodiment, it preferable to fix the primary image 10 and the lens 20 by suitable means. A specific example for fixing them is to locate a proper spacer between the primary image 10 and the lens 20, whereby those are spaced from each other by an appropriate distance. More preferably, a proper cover is applied to between the primary image 10 and the lens 20, which are properly spaced, thereby preventing light other than the light emanating from the primary image 10 from reaching the viewer E.

Supplemental matters of the invention will be described hereunder. If the screen display apparatus of the invention is used, one cannot only view the flat (two-dimensional) primary image in a three-dimensional fashion, but also view a three-dimensional image on the known three-dimensional display which is based on the binocular parallax of human vision, with more improved three-dimensional feeling. For the "display device" utilizing the binocular parallax, reference is made to JPA5-103352 or the like.

The lens 20 may be moved to the front and the rear by a known technique, and the focal distance of the lens may also be varied, if necessary, periodically, by using a micropiezo-actuator or the like. By so doing, the three-dimensional effect may be more improved. For the detail of this, reference is made to JP-A-2000-98298 already referred to in the background description, and others.

The screen display apparatus of the invention, in terms of the screen display apparatus of the embodiment mentioned above, is comprised of the primary image 10 and the lens 20 for converting it into the secondary images 30 to 36, which the lens 20 may be a microlens array consisting of a plurality of microlenses, or a lenticular lens. As readily seen from the description that the primary image 10 may be a photograph, an image on the CRT screen or the like, the primary image 10 is not limited to those ones. This implies that the screen display apparatus enables the viewer to view "any type" of the primary image 10 in a three-dimensional fashion, if the lens 20 is provided in front of the primary image. In this sense, it can safely be the that the present invention is directed mainly to the lens 20. In a case where some persons possess the primary images 10, those persons can view the images stereoscopically if they get only the lenses 20. In this case, the lens 20 may be constructed according to a type of the primary image 10 possessed, such as a photograph or a picture displayed on the CRT screen, as a matter of course.

EXAMPLES

Specific examples of the embodiment mentioned above will be described. The examples to be described hereunder were the screen display apparatuss shown in FIGS. 1, 6, 8 and 9. For those examples, the following items were evaluated while varying the inclination angle θ of the secondary image 30: "three-dimensional feeling" of the images obtained, "sense of incongruity" of the viewer E when views the images, and "fatigue" of the viewer when he continues his viewing of the images.

Before proceeding with the evaluation description, the specifications of those examples will briefly be described. In those examples, the image depicting medium was a plane LCD (liquid crystal display) device of 14 inches. Accordingly, the primary image 10 of each of FIGS. 1, 6, 8 and 9 was an image on this LCD device. The primary image 10 was a "motion picture" handled in a usual TV broadcasting. The lens 20 was a microlens array having the size of 14 inches, which is equal to the LCD device. It was constructed and arranged so as to satisfy the positional relationships of the secondary images 30, 31, 32 and 33 shown in FIGS. 1, 6, 8 and 9. The maximum focal distance of the lens in Example 1 was 4 cm.

Comparison 1 was a screen display apparatus in which the lens 20 was not provided in front of the LCD. Accordingly, a viewer viewed the LCD screen in usual manner. Comparison 2 was a screen display apparatus in which an inclination angle θ of the secondary image 30 was 2° (<5°), and Comparison 3 was a screen display apparatus in which an inclination angle θ of the secondary image 30 was 45° (<30°). The three-dimensional feeling and the sense of congruity of the viewer were evaluated.

Figure 13:
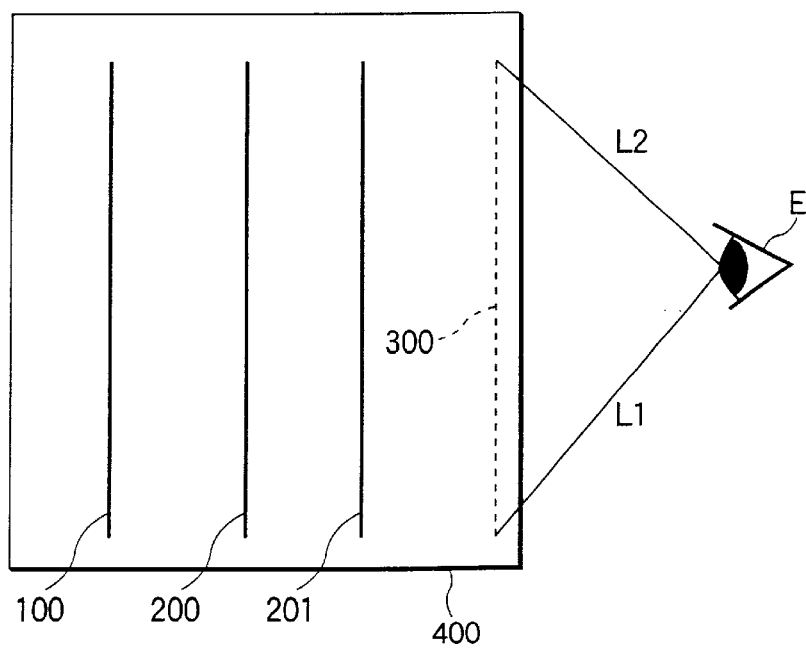
FIG. 13 is a diagram schematically showing an arrangement of a conventional screen display apparatus, which is capable of producing a three-dimensional image, and a position at which a secondary image formed by the system is displayed.
Figure 14:
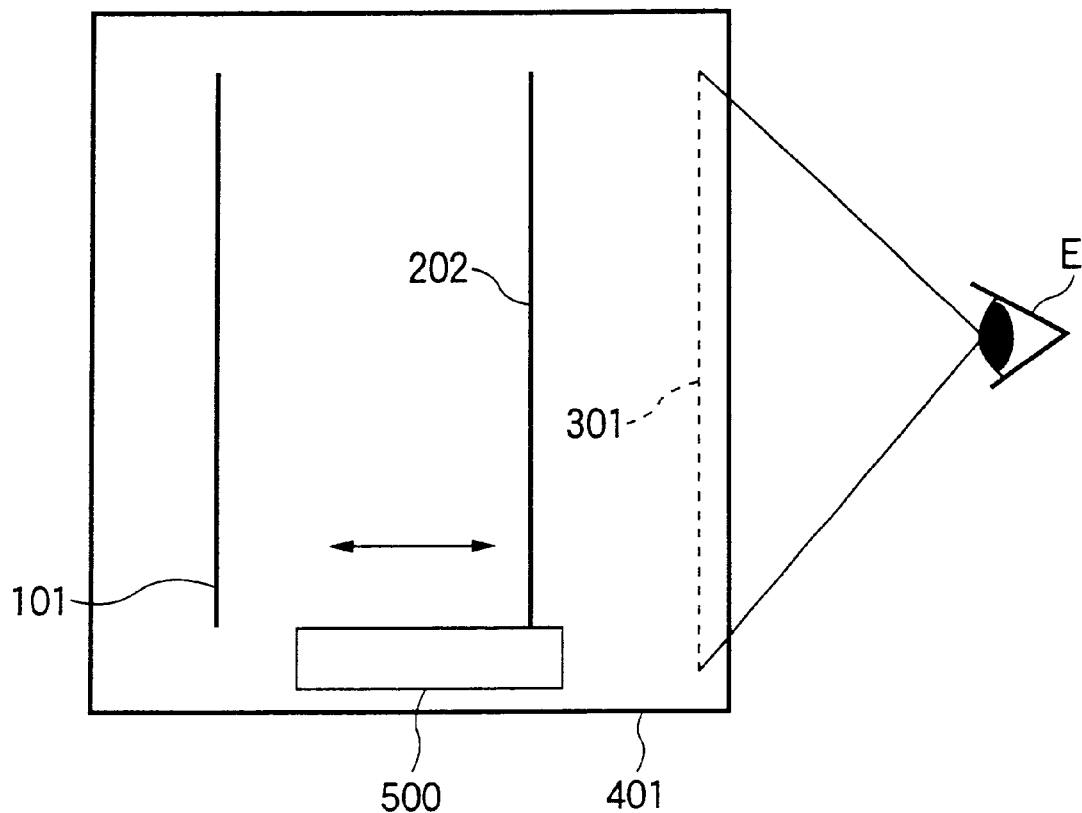
FIG. 14 is a diagram schematically showing an arrangement of another conventional screen display apparatus, which is capable of producing a three-dimensional image, and a position at which a secondary image formed by the system is displayed.
Figure 15:
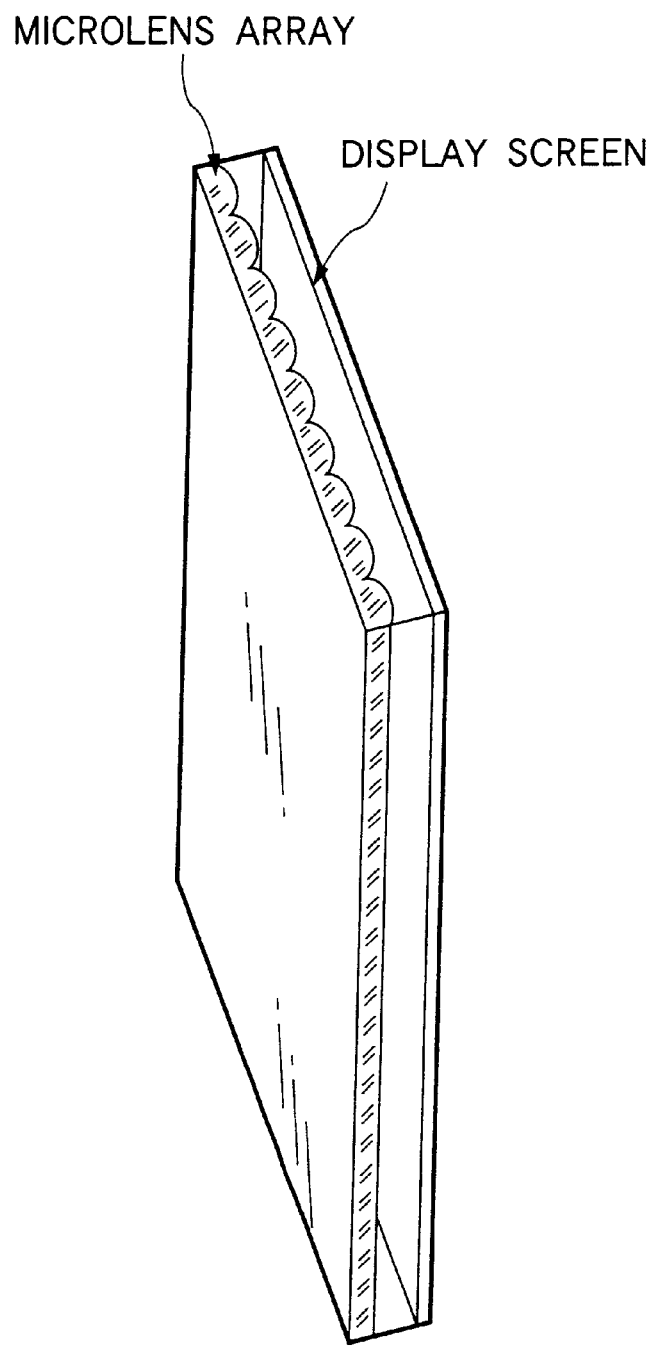
FIG. 15 is a diagram schematically showing a conventional structure for stereoscopic display, which uses a microlens array.

A stereoscopic display screen presented by using the "optical device" as disclosed in JP-A-60-59317 was used as a "Conventional Example", and subjected to the evaluation of those items. The construction of the "optical device" of the publication was as described with reference to FIG. 13. In FIG. 13, L1 and L2 referred to in the description in connection with FIG. 1 were: L1=L2. Where L1=L2, an image 300 is "not inclined" with respect to the viewer E.

The evaluation of the items, such as the stereoscopic feeling of the primary image 10 by the viewer E, was made under the above conditions, and the results of it were tabulated in the following table, Table 1.

TABLE 1

| | Construction | angle θ (°) | 3-D feeling | Congruity | Fatigue |
|---|---|---|---|---|---|
| Example 1 | FIG. 1 | 15 | large | Small | small |
| Example 2 | FIG. 6 | 20 | large | Small | medium |
| Example 3 | FIG. 8 | 25 | large | Small | medium |
| Example 4 | FIG. 7 | 10 | large | Small | small |
| Comparison 1 | None | — | None | None | small |
| Comparison 2 | FIG. 1 | 2 | small | None | small |
| Comparison 3 | FIG. 1 | 45 | large | Large | large |
| Conventional | FIG. 13 | 0 | medium | Small | medium |

From Table 1, it is clearly seen that the present invention has produced useful effects, when comparing with the evaluation results of Examples 1 to 4 and Comparison 1. Further, when comparing with Example 1 and Comparisons 2 and 3, it is confirmed that a preferable range of the inclination angle θ of the secondary image 30 is as described above ($5° \leq \beta \leq 30°$). The reason for this will be comprehended also from the contents of Table 1. Let us pay attention to Examples 1 to 4. Then, it will be seen that of those screen display apparatuss, the most preferable ones are Examples 1 (FIG. 1) and 4 (FIG. 7), when comparing with Examples 2 (FIG. 6) and 3 (FIG. 8).

Additional tests were conducted in which a CRT of a 28-inch size, whose surface is curved, was used, and other conditions were substantially the same as of the above mentioned. To make flat a virtual image being produced allowing for the curved surface of the CRT, the tests were conducted in two different ways: in one way, a lenticular lens was used which was formed, for the lens 20, on the basis of calculation of the focal distances of individual positions, and in the other way, a lenticular lens not so designed was used for the lens 20. The test results showed that in the screen display apparatus using the flat CRT screen, the three-dimensional effect was more intensive than and the fatigue was less than those in the system using the CRT screen remaining curved. Further, in those tests, it was confirmed that a moire pattern disappeared when the lens pitch was equal to the pixel pitch of the CRT.

As described above, it is clearly seen that the screen display apparatus and the lens structure are extremely simple in construction and low in cost.

<Second Embodiment>

Figure 16:
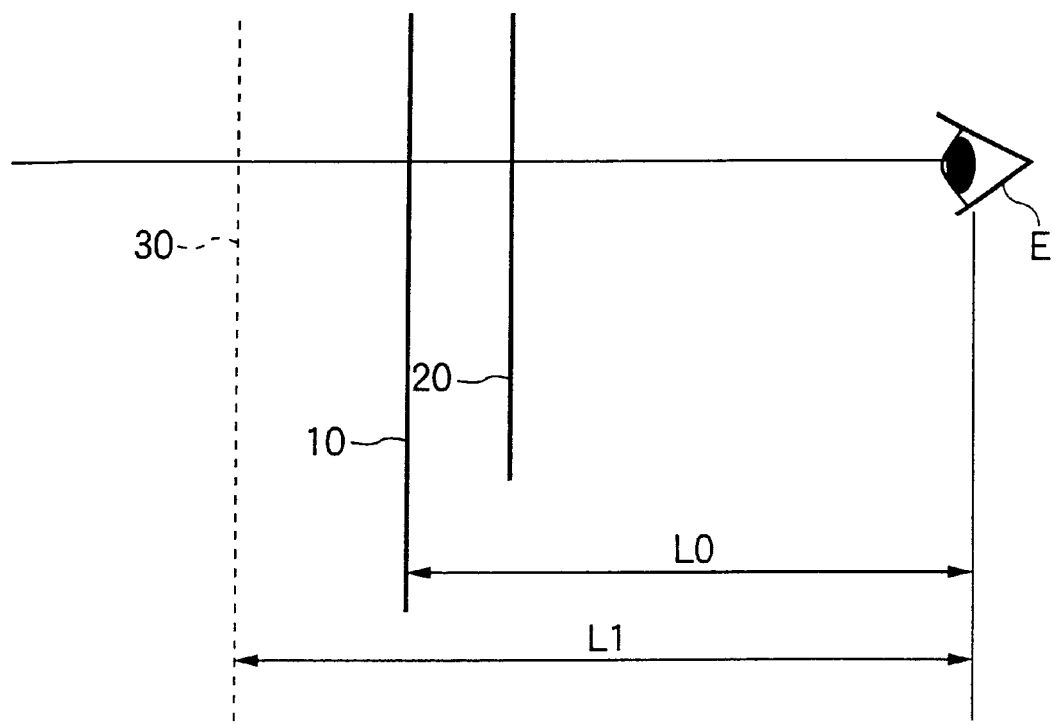
FIG. 16 is a diagram schematically showing an arrangement of a screen display apparatus which is a second embodiment of the present invention and a position at which a secondary image formed by the system is displayed.

A second embodiment of the present invention will be described with reference to the accompanying drawings. FIG. 16 is a diagram schematically showing an arrangement of a screen display apparatus which is a second embodiment of the present invention and a mode of its use. In FIG. 16, the screen display apparatus includes a primary image 10 as a subject so defined in the invention, an image depicting medium for depicting the primary image 10, and a lens plate 20. The views of FIG. 16, and FIGS. 19, 21 and 25, which will be referred to later, are schematic views, taken on a proper line, when the screen display apparatus is viewed from the side thereof.

The primary image 10 has the following meaning. When the image depicting means is a photograph, the primary image is a picture (i.e. a photograph itself) printed on the printing paper. When the image depicting means is a display device, such as a CRT or an LCD screen, the primary image is a picture displayed on the display device or a projection picture projected on a screen or the like.

The lens 20 is located between the image depicting medium for depicting the primary image and a viewer E, and forms a virtual image and/or a real image which will reach the viewer E, by using the primary image. Here, the virtual image and/or real image corresponds to a "secondary image" 30 in connection with the primary image 10. Specific examples of the lens 20 are a lenticular lens consisting of wavy lenses (small lenses) arrayed at given intervals and a microlens array consisting of a microlens array consisting of microlenses (small lenses), each having a circular or another shape, which are two-dimensionally arrayed.

Figures 17A, 17B:
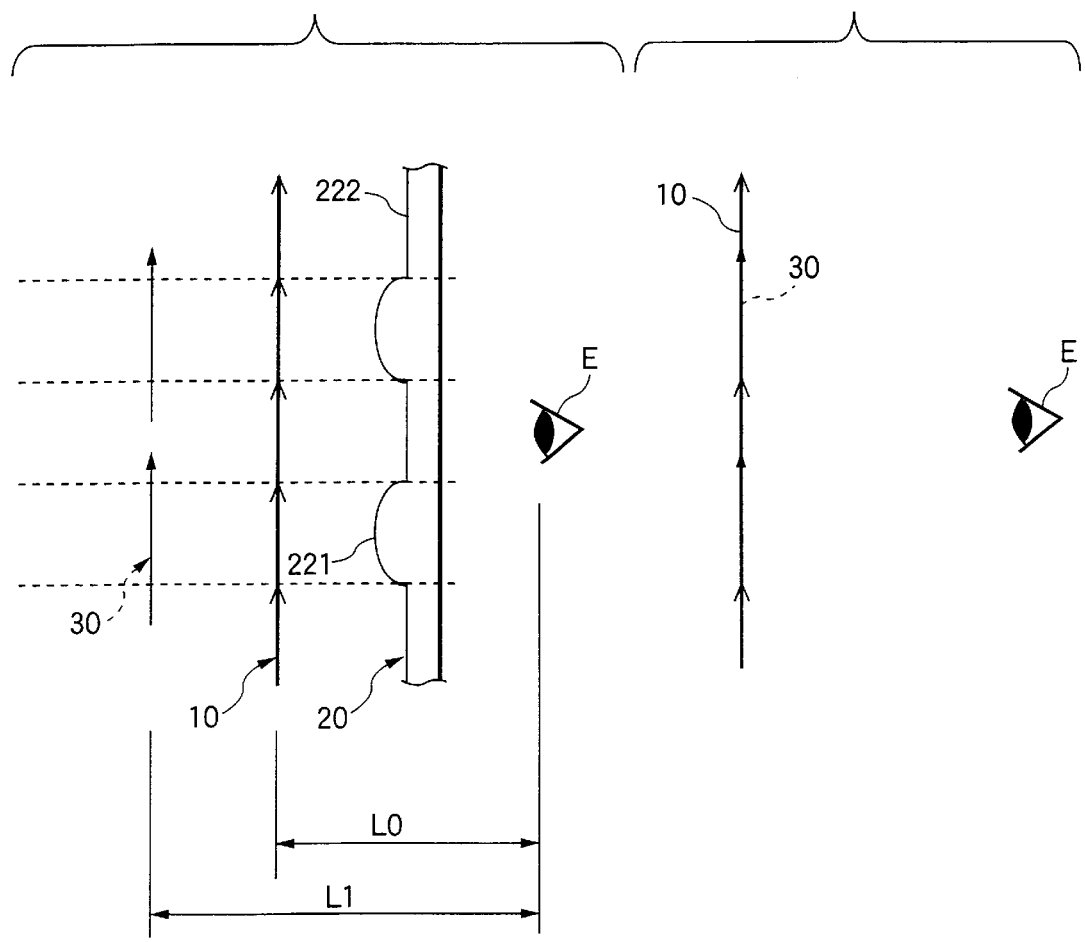
FIGS. 17A and 17B are explanatory diagrams showing a configuration of a lens for presenting a secondary image, which is used in the FIG. 16 system, FIG. 17A showing its overall configuration and FIG. 17B showing an image viewed from an observer in the form of a model.

A lens having a structure of the microlens array of those lenses is employed for the lens plate 20 in the second embodiment, and has a structure as shown in FIG. 17A. As shown, raised portions of the surface of the lens plate 20 are convex lenses 221 as microlenses, while the remaining portions are flat and have no lenses formed therein (i.e., having no lens action and are designated by reference numeral 222). In this sense, "microlens array 20", instead of the "lens plate 20", will be used only in the second embodiment and a third embodiment to be given later.

The operation and effect of the screen display apparatus thus arranged will be described hereunder. In the screen display apparatus of the second embodiment, as shown in FIG. 16, the viewer E does not view the primary image 10 directly, but "views" a secondary image 30 which is the primary image 10 as viewed through the microlens array 20.

The secondary image 30 is formed such that erect virtual images are formed at only those portions of the microlens array 20 where the convex lenses 221 are formed, as shown in the figure associated with FIG. 17A since the microlens array 20 of this embodiment is constructed as shown in FIG. 17A. Those secondary images 30, or the erect virtual images, are somewhat different in size from the original primary image 10, as shown in FIG. 17. Through the flat portions 222, the viewer E directly views the primary image 10 per se since the virtual images of the primary image 10 are not formed by the flat portions 222. Since the "primary image 10 per se" is viewed through the flat portions 222, it may be considered as the secondary image 30 in a "broad sense".

Figure 18A:
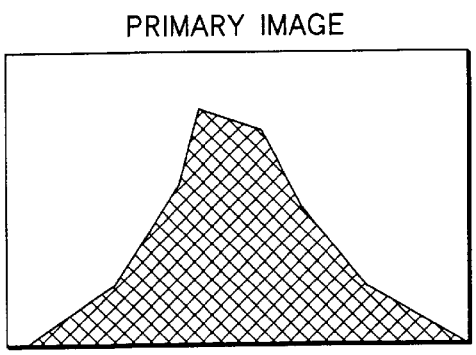
FIGS. 18A to 18D are diagrams showing a primary image in the FIG. 16 screen display apparatus and an image, which is formed through a lens action and viewed by an observer, FIG. 18A showing a primary image, FIG. 18B showing a primary image viewed through a planar or flat part of the lens, FIG. 18C showing a primary image viewed through a convex lens part of the lens, and FIG. 18D showing an image viewed by an observer.
Figure 18B:
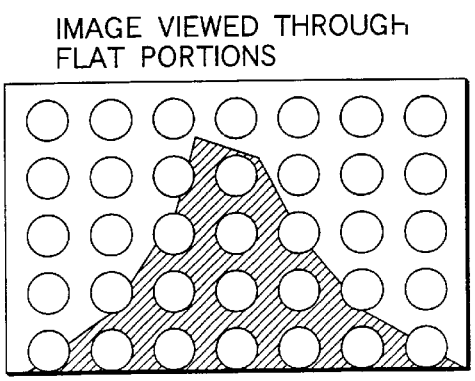
Figure 18C:
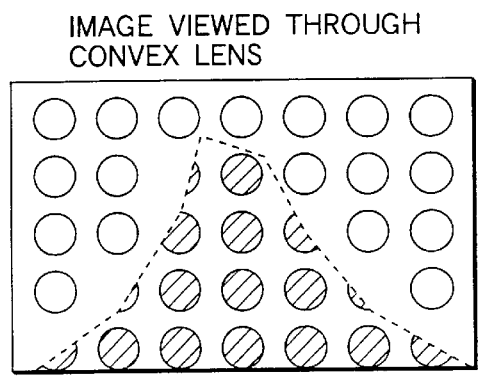
Figure 18D:
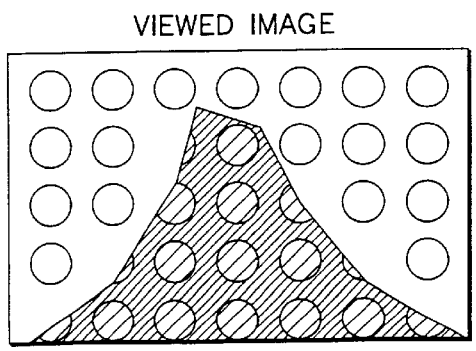

For clarity, a picture viewed when the viewer E views the primary image 10 is illustrated in FIG. 18A. In the picture, the primary image 10 is a "mountain". FIGS. 18B and 18C are pictures displayed on the screen when the viewer views the primary image 10 shown in FIG. 18A through the lens plate 20. The picture of FIG. 18B is a picture as viewed through the flat portions 222, and that of FIG. 18C is a picture as viewed through the convex lenses 221. A picture of FIG. 18D is the one as actually viewed by the viewer E, and as shown, the pictures of FIGS. 18B and 18C are superimposed one on the other. Actually, the convex lenses 221 and their lens pitch (its preferable value will be described later) are extremely small. In FIGS. 18A to 18C, the pictures are exaggeratedly illustrated. Bear this in mind when seeing those figures.

Thus, the viewer E views a mosaic picture as shown in FIG. 17B or 17D. In this case, the secondary image 30 is somewhat larger than the primary image 10, so that the secondary image 30 and the primary image 10 somewhat overlap with each other along the boundary therebetween (see FIG. 17B).

The screen display apparatus which provides such a "viewing" to the viewer E is able to given the viewer E a more intensive three-dimensionally effect than the conventional one. At the present stage where the reason why such a method produces the "three-dimensionally effect" is theoretically unknown as already described, it is difficult to exactly explain why the arrangement of the screen display apparatus of the invention produces such an intensive three-dimensionally effect. The reason for this that we can estimate will be given hereunder.

As shown in FIGS. 16 and 17, the viewer Es simultaneously views the primary images 10 (through the flat portions 222) and the secondary images 30, which are located at different positions defined by distances L0 and L1, related as L1>L0, where L0 is a distance from the viewer E to the primary image 10 and L1 is a distance from the viewer to the secondary image 30. The viewer E cannot discriminate between the primary image 10 and the secondary image 30 on the viewed image (FIG. 18D), so that he cannot perceive the position of the image viewed. It is estimated that a major reason why the system arrangement produces the "intensive three-dimensionally effect" is that a distance perceiving function of the eyes of the viewer E will be lost during such a process.

More exactly, the viewer E perceives one image as shown in FIG. 18D with his eyes. In this case, two true distances are present between the viewer and the image (distances L0 and L1). It is impossible that the viewer E perceives a distance up to the image by using his binocular parallax, binocular vergence and the adapting function of his crystalline lenses. In order that the viewer E makes a perception as to whether the image is flat or three dimensional, it is inevitable to combine such means as size of thing, light and shade, and his "experience" to obtain the three-dimensionally feeling". From this, it is estimated that the brain of the viewer E (three-dimensionally) judges that a distant mounting looking small is located in the distance, and a large tree looking large is located nearby For this reason, it is generally difficult that the viewer three-dimensionally perceives the primary image containing only a simple geometrical pattern and ordinary characters. In contrast, there is a tendency that the images (scene, portrait and the like) that the human being sees in daily life are perceived three dimensionally.

<Third Embodiment>

Figure 19:
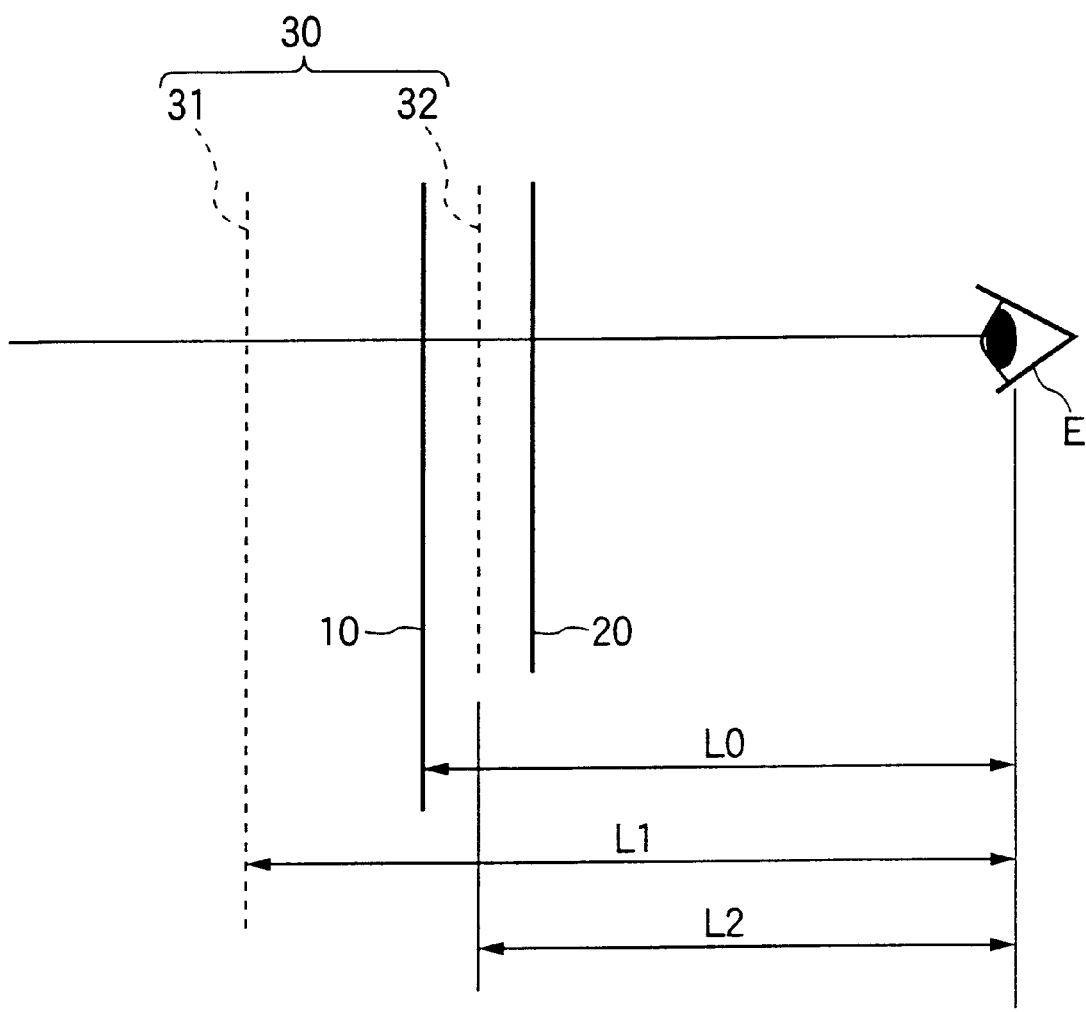
FIG. 19 is a schematic diagram showing an arrangement of a screen display apparatus which is a third embodiment of the present invention and a position at which a secondary image formed by the system is displayed.

A third embodiment of the present invention will be described hereunder. The third embodiment is different from the second embodiment in the structure of the microlens array 20 (as shown in FIGS. 19 and 20), and a picture viewed from the viewer E, which the difference arises from the lens structure difference. Emphasis is placed on those different points in the description to follow, while for the remaining portion of the embodiment, reference is made to the related description in the second embodiment.

In FIG. 20, the microlens array 20 consists of convex microlenses 221 and concave microlenses 223. With such a structure of the microlens array 20, the secondary image 30 is as shown in FIGS. 19 and 20: one virtual image 31 as a secondary image is located at a position farther than the primary image 10 as viewed from the viewer E, and a virtual image 32 as another secondary image is located at a position closer than the same. Thus, in the second embodiment, there is no case that the primary image 10 "per se" is viewed, unlike the second embodiment. In this case, the virtual image 31 is somewhat larger than the original primary image 10, like the secondary image 30 in the second embodiment. Conversely, the virtual image 32 is somewhat smaller than the original primary image 10.

The thus constructed third embodiment produces the useful effects comparable with those of the second embodiment. The reason for this follows. As already described, in the third embodiment, the viewer views the virtual image 32 which is the secondary image 30 as viewed through the concave microlenses 223, while in the second embodiment, the viewer views the primary image 10 per se through the flat portions 222. Even in such a case, the already-described explanation of the three-dimensionally viewing based on the distance perceiving function of the eyes may directly be used for explaining the three-dimensionally viewing.

The third embodiment produces the following effect in particular. It is allowed that a difference between a position of one of two images coexisting in the image viewed by the viewer E to the viewer E and a position of the other image is selected to be large. The reason for this will readily be understand when comparing the FIGS. 16 and 19 structures. Accordingly, it is easy to cause the optical illusion during the process of positioning the image viewed, in the viewer E. As a result, a more intensive three-dimensional effect is yielded.

In those embodiments, part of the primary image 10 and part of the secondary image 30 coexist in the image viewed by the viewer E in the second embodiment. In other words, the primary image 10 is divided by the primary image 10 viewed through the flat portions 222 and the secondary image 30. In the third embodiment, it is divided by the virtual images 31 and 32. Assuming that a distance from the viewer to pixels forming the secondary image is Lx and a distance from the viewer to pixels forming another secondary image is Ly, the following expression is preferably satisfied under a condition that Lx>Ly.

$$Lx-Ly \geq 0.05 \cdot Ly \qquad (1)$$

If the difference is out of the range defined above, the screen display apparatus of each embodiment fails to produce the effect "The divided image is perceived as a single three-dimensional image." Accordingly, it will be perceived as a single image, "intrinsically".

The upper limit of the difference Lx–Ly, unlike the lower limit, is not always limited; however, it is selected to preferably be as given by the following expression in order to lessen the fatigue of the viewer.

$$0.5 \cdot Ly \geq Lx-Ly \qquad (2)$$

It is noted that the meaning of "Lx and Ly satisfying the expressions (1) and (2) "preferably present"." is that for most of the image as viewed, it is satisfactory to satisfy the expressions (1) and (2), and for a small part of the image, for example, an area of 5 to 10% as large as the entire area of the image, if those expressions are not satisfied, viz., it is out of the above difference range, no problems will arise (this will subsequently be described with reference to FIG. 22).

In the second embodiment, Lx corresponds to L1, and Ly corresponds to L0. In the third embodiment, Lx corresponds to L1, and Ly corresponds to L2 (distance to the virtual image 32, see FIG. 19 or 20). Those will readily be understood.

It is preferable that the primary image 10 and the microlens array 20 are used while being fixed by appropriate means, in those embodiments. An example of the fixing is that a spacer is located between the primary image 10 and the microlens array 20, whereby those are separated from each other by a proper distance. More preferably, a cover is provided between the primary image 10 and the microlens array 20, which are thus separated. By so doing, light other than light of the primary image 10 is blocked from reaching the viewer E.

The description to follow is details of the lens plate 20 described in the second and third embodiments, particularly a method of manufacturing the lens phase 20, a preferable structure of the lens plate 20, and the others.

<Manufacturing Method>

The lens plate 20, as already described, may be a lenticular lens, a microlens array or the like. Many known methods or means may be selectively used for manufacturing those lenses. The "lens plate" handled in the invention may be manufactured by any of those known methods. For the manufacturing method of the lens plate, the invention is not limited in any way.

<Lens Pitch>

A pitch at which the wavy lenses or the microlenses are arrayed in the lenticular lens or the microlens array thus manufactured is 500 µm or shorter, preferably 300 µm or shorter, more preferably 50 µm or shorter. The reason why the pitch is so selected in value is that if the pitch is excessively long, the natural feeling of the secondary image 30 will be lost. In the invention, there is no reason to limit the lower limit in particular. However, to secure good mass production of the lens plates 20, it is preferable that the lens is 5 µm or longer. Further, it is believed that such a value of the lens pitch indicates a marginal capacity of the present technique.

In a case where the image depicting medium is a CRT or an LCD display, the lens pitch of the wavy lenses or the microlenses is selected to preferably be integer times or 1/integer as large as the pixel pitch of the display, more preferably the lens pitch of the lens 21 or 22 is equal to the latter. By so doing, the moire pattern which will appear in the secondary image 30 is minimized. If required, the lens pitch may be not uniform but randomly varied. In this case, the "random array" of the lens pitch involves not only such a case where the microlenses are randomly arrayed over the entire lens plate 20 but also such a case where a group of microlenses randomly arrayed for a short period is repeated for a long period.

<Lens Structure—Microlens Array>

Figure 21A:
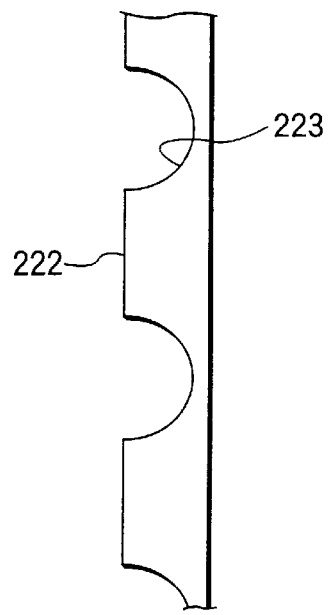
Figure 21B:
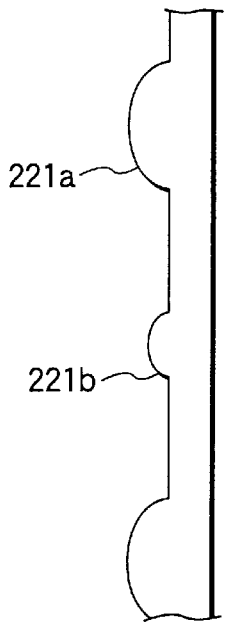

Various microlens arrays may be used in addition to the microlens arrays of the FIGS. 17 and 20. An example of them is shown in FIG. 21. In the FIG. 21A example, concave microlenses 223 and flat portions 222 are alternately arrayed such that the concave microlenses 223 are curved inward while those are curved outward in the lens plate 20 of the first embodiment. In FIG. 21B, large convex microlenses 221a and small convex microlenses 221b are alternately arrayed such that flat portions 222 are located between the adjacent convex microlenses. Further, in FIG. 21C, large and small convex microlenses 221a, and large and small concave microlenses 223a and 223b are arrayed. This lens structure may be applied to the lens plate 20 which is for avoiding the moire pattern formation, last mentioned.

Figure 21C:
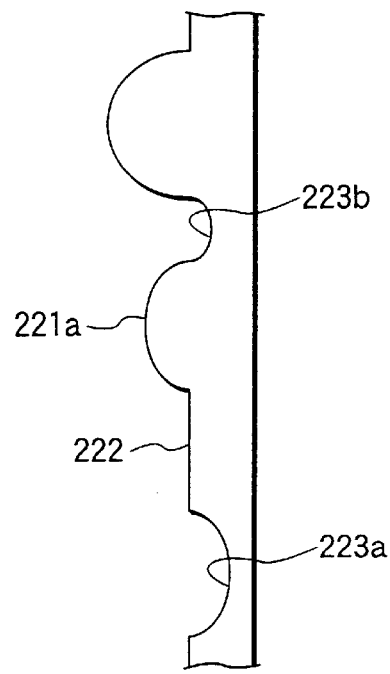
Figure 21D:
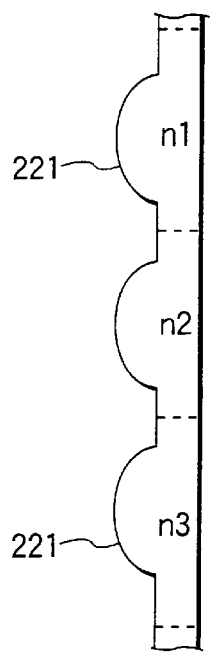
Figure 21E:
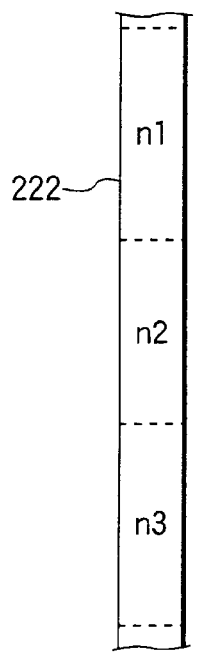

A lens structure of FIG. 21d resembles in configuration that of the lens plate 20 of the first embodiment. In this structure, the refractive indices of the convex microlenses 221 are different for each lens (those lens elements are demarcated by a broken line and the refractive indices are denoted by N1, n2, n3). In the lens structure of FIG. 21E, like the FIG. 21D structure, the refractive index is locally varied, while the "lens plate" is entirely formed as the flat portions 222. This type of lens is generally called a "refractive distribution type" lens, and well known. The lens may be considered such that the "microlenses" handled in the invention are formed at the portions of different refractive indices.

In addition to those lenses shown in FIG. 21, a planar lens utilizing the diffraction grating or hologram or other known lenses may be used in the invention.

As a generalization, those lenses may be considered as the microlens arrays consisting of the combination of concave or convex lenses having different focal distances and other lenses, which are locally arrayed on a single lens. Further, since focal distances are different, the image viewed by the viewer E may be forms as an image in which a plurality of secondary images 30 or primary images 10 coexist, viz., an image formed by dividing the primary image 10 by those images.

To be more specific, as an extension of the technical idea as shown in FIG. 21B, by using a lens array 20 consisting of four groups of convex microlenses 221 (four groups of the convex microlenses 221a, 221b, 221c, 221d, not shown), which are varied in configuration or size for each group, the secondary image 30 is formed as four virtual images 31 to 34 (not shown), and the viewer E simultaneously views those images to perceive a single secondary image 30.

In the lens structures of FIGS. 21C and 21D, an image based on a regular pattern (e.g., mosaic pattern) as shown in FIGS. 17 and 20 is not always formed. However, such also falls within the scope of the invention. That is, where the microlens array 20 is used, the secondary image 30 loses its flat form as shown in FIGS. 16 or 19, and so to speak, "separate" secondary images 30 are formed. In other words, the pixels forming the entire secondary image 30 is located close to the viewer E, and other pixels are located far from the viewer. Accordingly, the secondary image 30 per se is distributed in a three dimensional space or a plurality of secondary images 30F, 30N, . . . are present therein.

Figure 23:
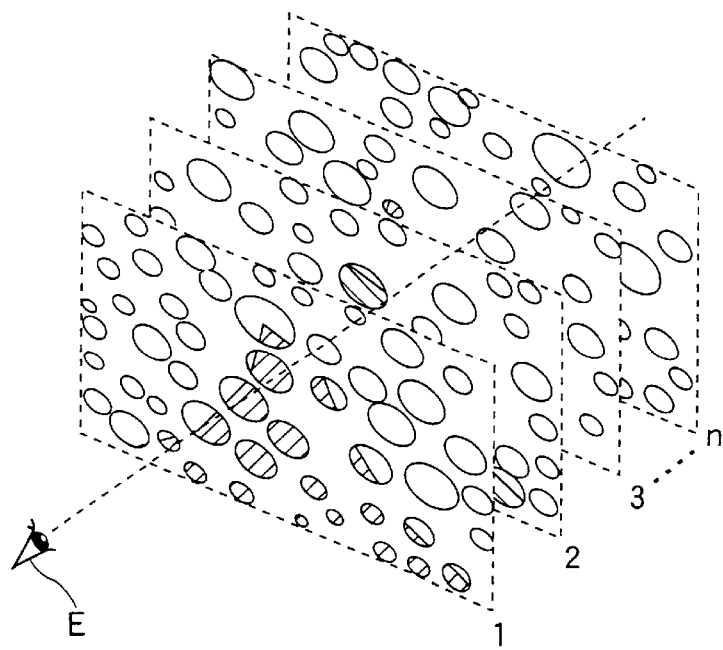
FIG. 23 is a perspective view showing how a secondary image as shown in FIG. 22 is formed by using a lens plate as shown in FIG. 21C.
Figure 24:
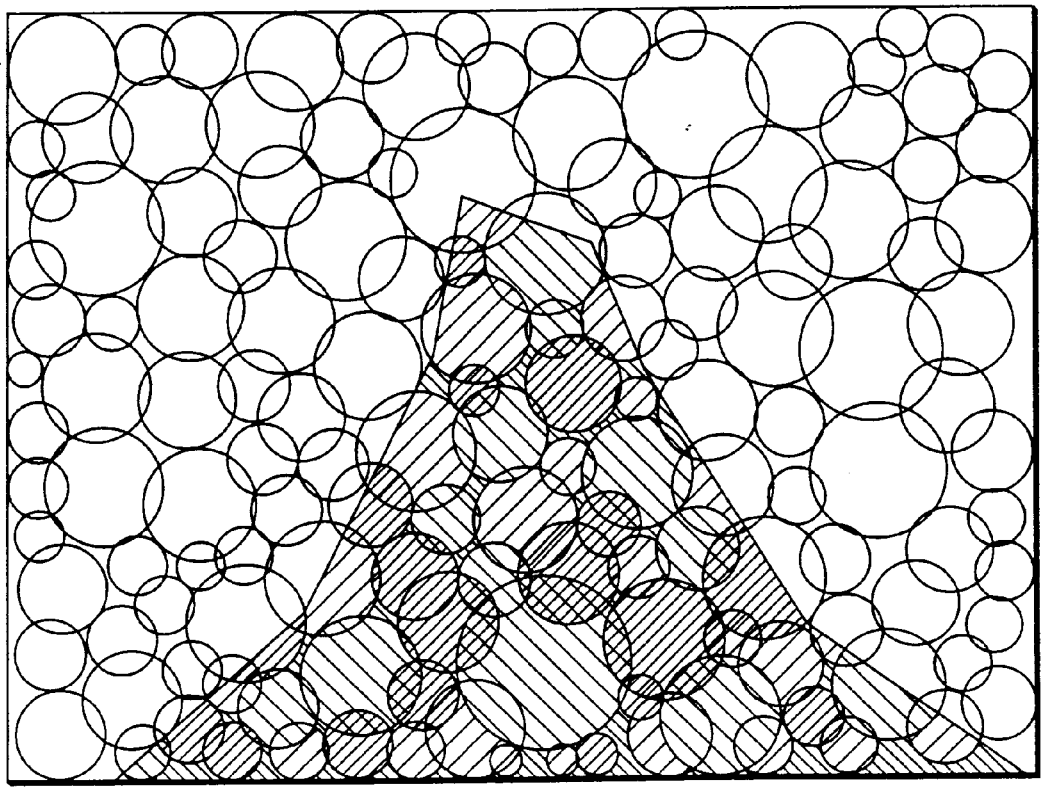
FIG. 24 is a diagram showing an image presented when an observer views a secondary image as shown in FIG. 22, which formed by using a lens plate as shown in FIG. 22C.

FIGS. 23 and 24 illustrate a model of the "separate" secondary images 30, which are formed by using the lens array as shown in FIG. 21C for the microlens array 20. The former is a perspective view conceptually showing them, and the latter (FIG. 24) is a diagram showing an image viewed as in the case of FIG. 18D. Such an image state is formed by using the microlens array 20 consisting of microlenses regularly arrayed as shown in FIGS. 21C, 21D or he like, and further by using the microlens array in which the focal distances of the microlenses are not completely equal, or depending on a positional relationship between the viewer E and the microlens array 20.

Also in such a case, the viewer E feels the three-dimensionally effect as in the second and third embodiments. Particularly, when the viewer E views the "separate" secondary images 30 as shown in FIG. 22, the optical illusion or disorder of the distance perceiving function, which will occur in the viewer E, is greater than that of the above embodiments. As a result, the three-dimensionally effect produced is more intensive.

Figure 22:
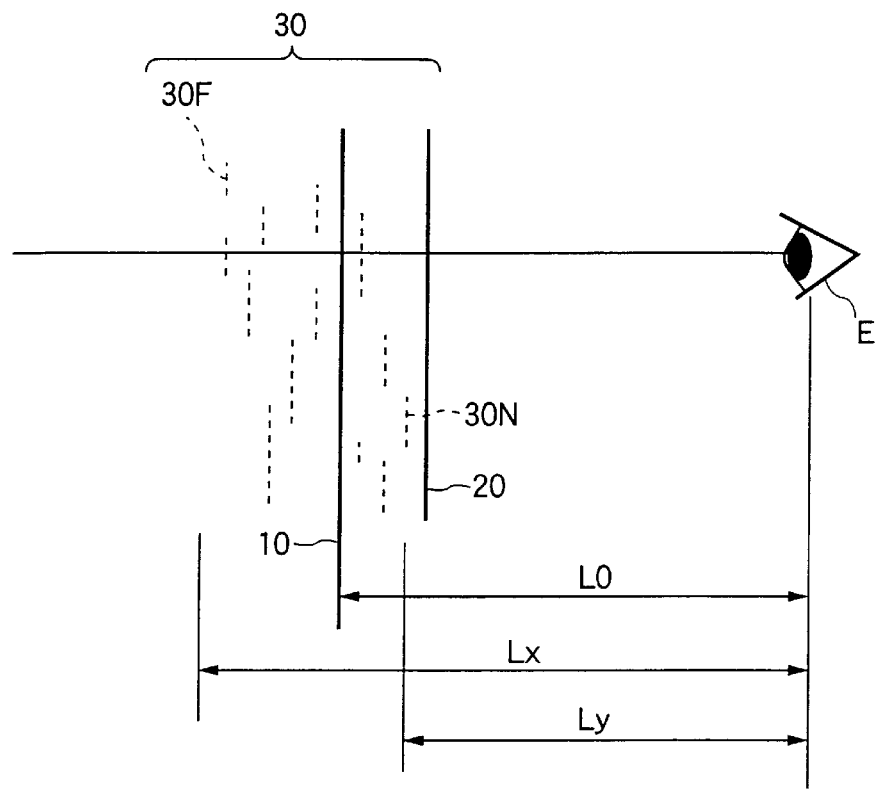

In the case as shown in FIG. 22, the distance Lx is a distance to the virtual image 30F located furthest from the viewer E, and the distance Ly is a distance of the virtual image 30N located closes to the viewer E. In this case, as described above, there is no need of satisfying the expressions (1) and (2) for "all" pixels forming the plural secondary images 30. In other words, the secondary image located farther from the viewer E than the virtual image 30F or the pixels thereof, and the secondary image closer to the viewer E than the virtual image 30N or the pixels thereof may be present. In this case, it is preferably within 5 to 10% of the area of the image viewed by the viewer E, as described above.

The respective lenses shown in FIG. 21 may be manufactured by using modified manufacturing methods described above. To form convex microlenses of different focal distances on the microlens array 20, a mold used in the pressure molding method is varied in configuration or the convex lenses after molded are shaped as intended by heating. In an alternative method, the refractive indices of the convex lenses are varied by using different materials for the convex lenses (corresponding to the FIGS. 21D and 21E cases).

<Lens Structure—Lenticular Lens>

The details of the microlens array mentioned above may correspondingly be applied to the lenticular lens. To obtain a more beautiful secondary image, it is suggestible to use the microlens array rather than the lenticular lens. The reason for this is that in the case of the lenticular lens, the primary image is converted into the secondary image every line (or one-dimensionally) (see FIG. 2), while in the case of the microlens array, the image conversion is performed every pixel (or two dimensionally).

<Lens Structure—Others>

Figure 25:
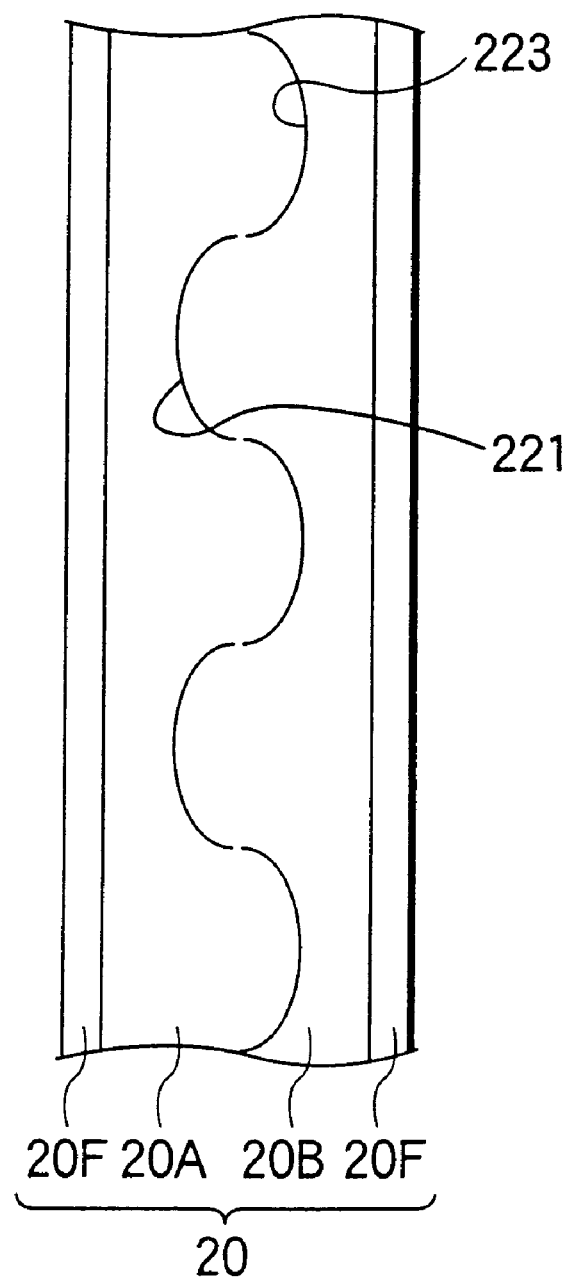
FIG. 25 is a diagram structurally showing a lens having a composite structure.

Additionally, for the lens plate 20, the following description also holds. A "pasted lens structure" formed by pasting together two or more types of materials being different in refractive index rather than a single lens structure is preferable for the lens 20. The pasted lens structure is as shown in FIG. 25. As shown, the microlens array 20 consists of two microlens arrays 20A and 20B, which are pasted together, each of those lens arrays consisting of convex microlenses 221 and concave microlenses 223. The refractive indices of those lens arrays 20A and 20B are different from each other. Where this lens structure is used, the object of making large the distance between the virtual images as the secondary image is more effectively achieved.

It is preferable that the microlens array 20 of the invention is provided with a anti-reflection film 2F as shown also in FIG. 25. If so done, the viewer E stably views a three-dimensional image while being from nuisance scattering light.

Especially referring to the lenticular lens, a "pasted lens" having the following structure may be used. In the structure, two lenticular lenses are pasted together such that the directions of the wavy lens elements of those lenses are orthogonal to each other or slanted at a given angle. In some case, a "pasted lens" which is the combination of the lenticular lens and the microlens array may be used. The lens is not limited to a lens consisting of a single lens, but it may be a lens composed of two or more number of lenses separately disposed. Further, the lens may be a lens which is composed of two lenses, one consisting of a group of convex lens elements and the other consisting of a group of concave lens elements, or formed with those lenses pasted together. It should be understood that those lenses last mentioned fall within the scope of the present invention.

Supplemental matters of the invention will be described hereunder. If the screen display apparatus of the invention is used, one cannot only view the flat (two-dimensional) primary image in a three-dimensional fashion, but also view a three-dimensional image on the known three-dimensional display which is based on the binocular parallax of human vision, with more improved three-dimensional feeling. For the "display device" utilizing the binocular parallax, reference is made to JP-A-5-103352 or the like.

The lens 20 may be moved to the front and the rear by a known technique, and the focal distance of the lens may also be varied, if necessary, periodically, by using a micropiezo-actuator or the like. By so doing, the three-dimensional effect may be more improved. For the detail of this, reference is made to JP-A-2000-98298 already referred to in the background description, and others.

The screen display apparatus of the invention, in terms of the screen display apparatus of the embodiment mentioned above, is comprised of the primary image 10 and the lens plate 20 for converting it into the secondary image 30, which the lens array may be a microlens array consisting of a plurality of microlenses, or a lenticular lens. As readily seen from the description that the primary image 10 may be a photograph, an image on the CRT screen or the like, the primary image 10 is not limited to those ones. This implies that the screen display apparatus enables the viewer to view "any type" of the primary image 10 in a three-dimensional fashion, if the lens 20 is provided in front of the primary image. In this sense, it can safely be the that the present invention is directed mainly to the lens 20. In a case where some persons possess the primary images 10, those persons can view the images stereoscopically if they get only the lenses 20. In this case, the lens 20 may be constructed according to a type of the primary image 10 possessed, such as a photograph or a picture displayed on the CRT screen, as a matter of course.

EXAMPLES

Specific examples of the embodiment mentioned above will be described. The examples to be described hereunder were the screen display apparatuss shown in FIGS. 16, 19 and 22. For those examples, the following items were evaluated while varying the difference between the distances Lx and Ly: "three-dimensional feeling" of the images obtained, "sense of incongruity" of the viewer E when views the images, and "fatigue" of the viewer when he continues his viewing of the images.

Before proceeding with the evaluation description, the specifications of those examples will briefly be described. In those examples, the image depicting medium was a plane LCD (liquid crystal display) device of 14 inches. Accordingly, the primary image 10 of each of FIGS. 16, 19 and 22 was an image on this LCD device. The primary image 10 was a "motion picture" handled in a usual TV broadcasting. The lens 20 was a microlens array having the size of 14 inches, which is equal to the LCD device.

In the test, Example 6 was a screen display apparatus in which the difference between the distances Lx and Ly is within the difference range of the expression (1). Example 7 was a screen display apparatus in which the difference is out of the difference range. Example 8 was a screen display apparatus in which the lens pitch is in excess of 500 $\mu$m. For those examples, the "three-dimensional feeling", "sense of incongruity", and "fatigue" of the viewer were enaluated.

The evaluation of the items, such as the stereoscopic feeling of the primary image 10 by the viewer E, was made under the above conditions, and the results of it were tabulated in the following table, Table 2.

Lx and Ly are within the difference range defined by the expression (1) or (2). The reason for this will be seen from the contents of Table 2.

Further, when Examples 1 to 3 with Example 8, it is seen that the preferable lens pitch is 500 $\mu$m or shorter in value in order to lessen the sense of incongruity, and the fatigue.

As seen from the foregoing description, in the screen display apparatus of the invention, a plurality of secondary images are formed by using the unique lens structure. Those secondary images are displayed such that those images are percieved as a single image. Accordingly, the screen display apparatus of the invention visually presents an image with an intensive three-dimensional effect. Further, the screen display apparatus is simple in construction and low in cost.

What is claimed is:

1. A screen display apparatus comprising:
   a lens plate including a plurality of small lenses and located between a primary image of a subject and a viewer, wherein said lens plate is configured to form a plurality of secondary images differently distanced from said viewer such that each distance between one of said plurality of secondary images and said viewer is created independently of the primary image, and to enable said viewer to perceive said plurality of secondary images as a single three-dimensional image.

2. A screen display apparatus according to claim 1, wherein Lx is a distance from said viewer to pixels forming one of said plurality of secondary images, Ly is a distance from said viewer to pixels forming another secondary image, when Lx>Ly, and the following expression is satisfied:

$$Lx-Ly \geq 0.05 \cdot Ly.$$

3. A screen display apparatus according to claim 1, wherein Lx is a distance from said viewer to pixels forming one of said plurality of secondary images, Ly is a distance from said viewer to pixels forming another secondary image, when Lx>Ly, and the following expression is satisfied:

$$0.5 \cdot Ly \geq Lx-Ly.$$

4. A screen display apparatus according to claim 1, wherein a maximum value of a lens pitch of said plurality of small lenses arrayed is 500 $\mu$m or shorter.

TABLE 2

|  | Construction | Lx, Ly | Max. pitch ($\mu$m) | 3-D feeling | Congruity | Fatigue |
|---|---|---|---|---|---|---|
| Example 1 | FIG. 1 | 0.2 Ly | 50 | Large | None | small |
| Example 2 | FIG. 1 | 0.4 Ly | 100 | Large | small | small |
| Example 3 | FIG. 1 | 0.07 Ly | 300 | Medium | none | small |
| Example 4 | FIG. 4 | 0.1 Ly | 80 | Large | none | small |
| Example 5 | FIG. 7 | 0.2 Ly | 60 | Large | none | small |
| Example 6 | FIG. 1 | 0.01 Ly | 100 | Small | none | small |
| Example 7 | FIG. 1 | 0.8 Ly | 100 | Small | medium | medium |
| Example 8 | FIG. 1 | 0.2 Ly | 1500 | Small | large | large |

From Table 1, it is clearly seen that the present invention has produced useful effects. In particular, when carefully examining the transition from Example 1 to Example 3, it is understood how the "three-dimensional feeling", "sense of incongruity", and "fatigue" of the viewer change. Further, it is proved that an intensive three-dimensionally feeling is secured even when the secondary image 30 consist of a plurality of virtual images as in the fourth and fifth embodiments, or as shown in FIGS. 4 and 7. When comparing Examples 1 to 3 with Examples 6 and 7, it will be understood that the preferable difference values between the 5. A screen display apparatus according to claim 1, wherein said lens plate includes a portion where said plurality of small lenses are formed and another portion having no lens action.

6. A screen display apparatus according to claim 1, wherein said plurality of small lenses are convex and concave microlenses.

7. A screen display apparatus according to claim 1, wherein distances from said viewer to said plurality of secondary images are different for each said small lens.

* * * * *